Oct. 22, 1963

J. W. GRAY ETAL 3,108,182

NAVIGATION SYSTEM

Filed April 3, 1957

INVENTORS
JOHN W. GRAY
WILLIAM H. HEATH
BY RONALD A. FINKLER

ATTORNEY

Oct. 22, 1963  J. W. GRAY ETAL  3,108,182
NAVIGATION SYSTEM
Filed April 3, 1957  15 Sheets-Sheet 3

INVENTORS.
JOHN W. GRAY
WILLIAM H. HEATH
BY RONALD A. FINKLER

ATTORNEY.

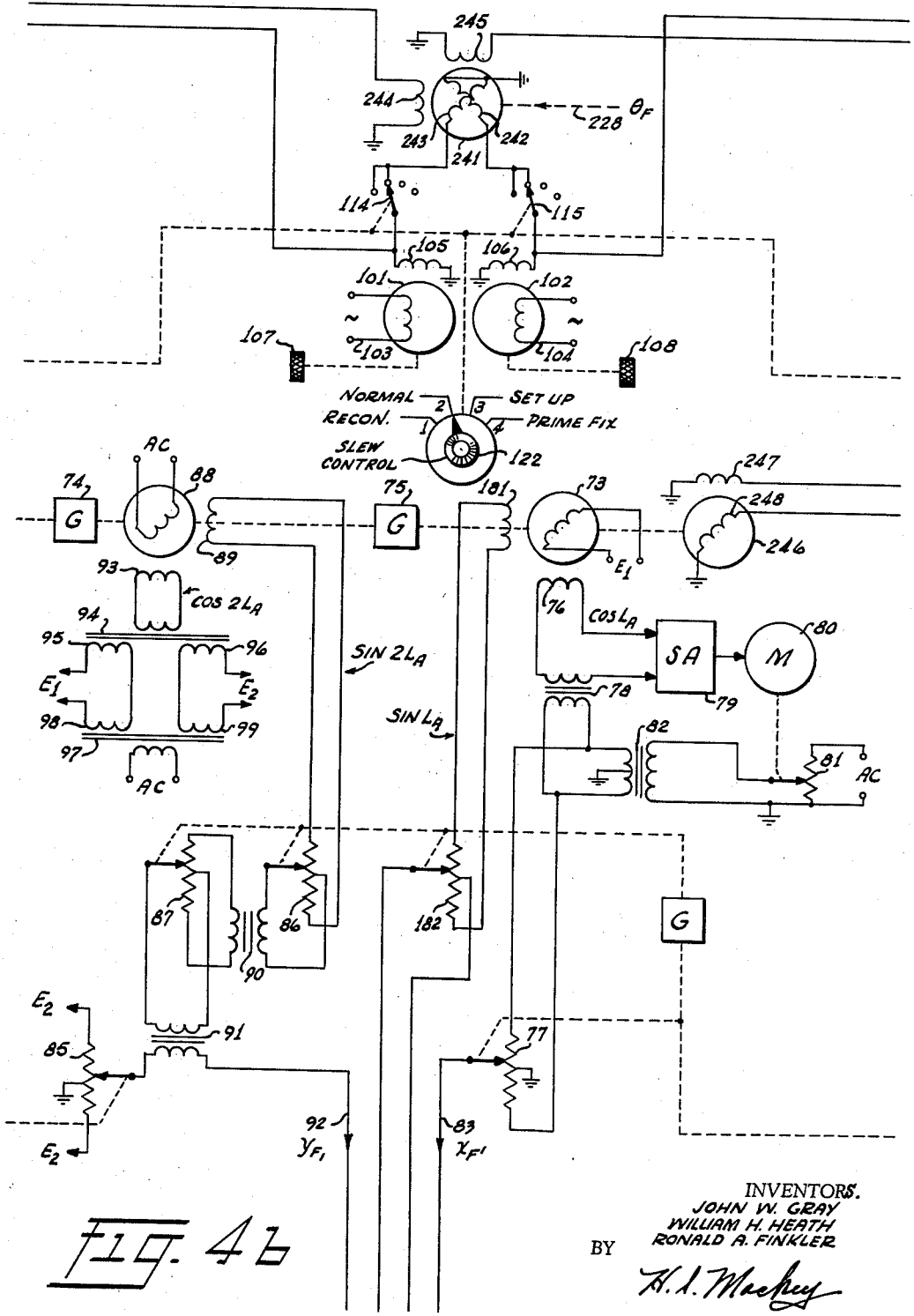

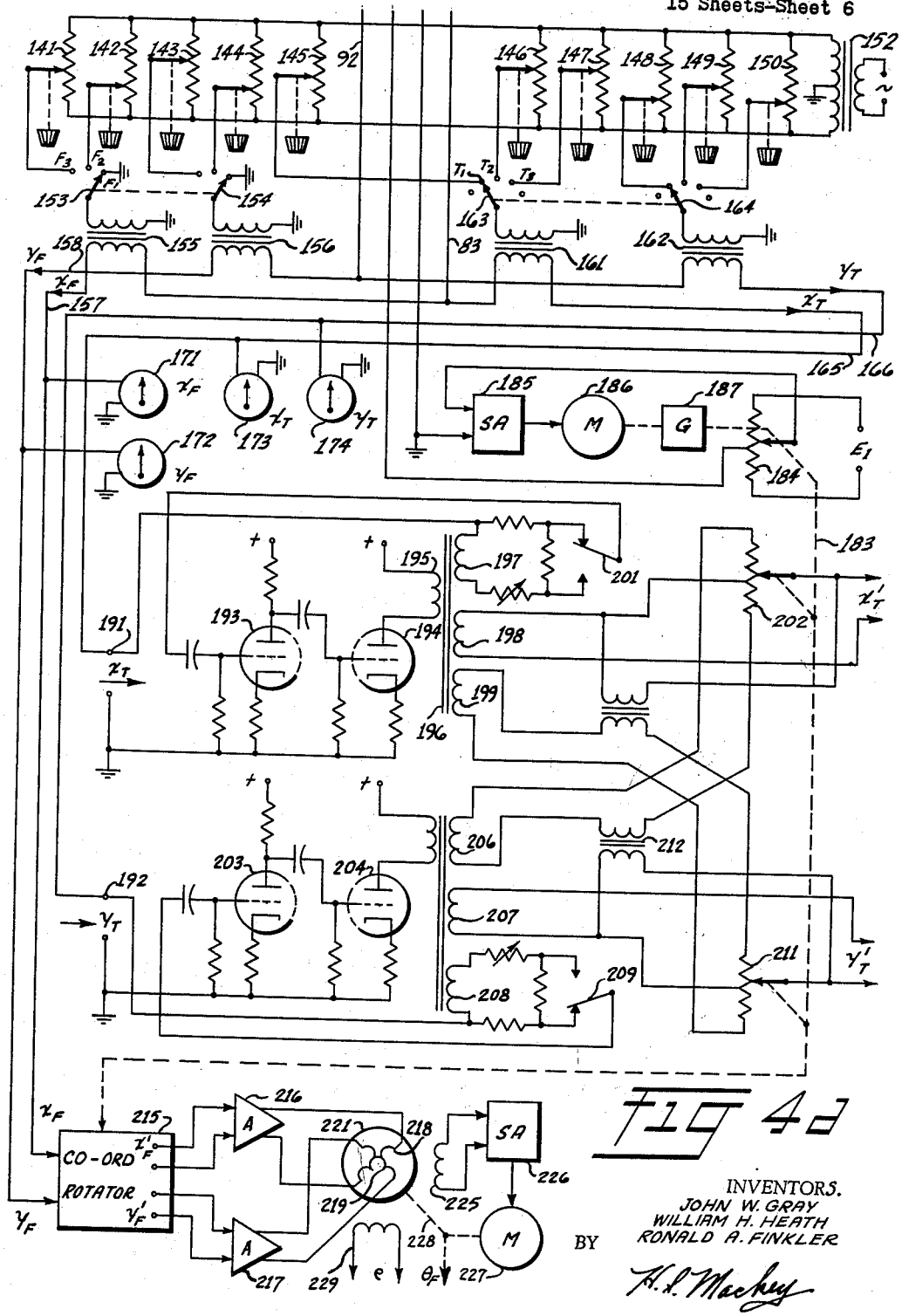

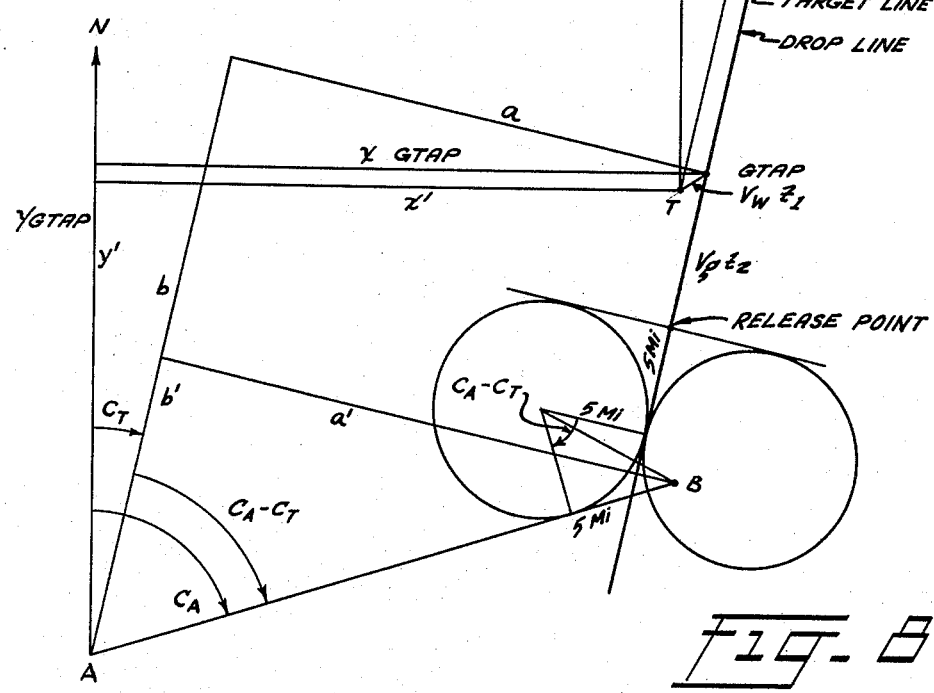
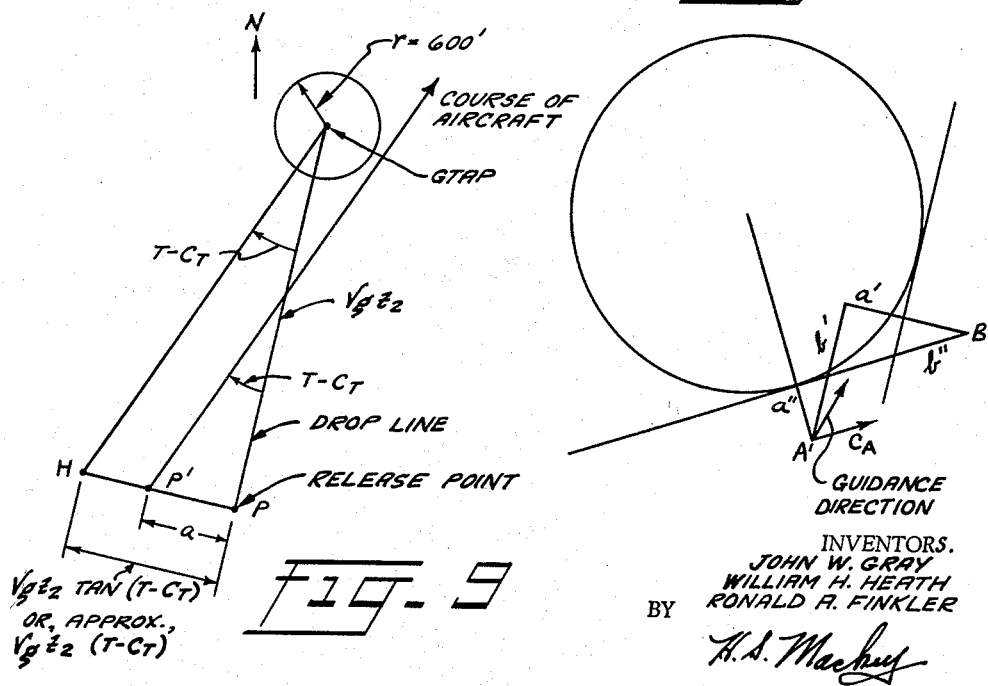

Oct. 22, 1963

J. W. GRAY ETAL 3,108,182

NAVIGATION SYSTEM

Filed April 3, 1957

INVENTORS.
JOHN W. GRAY
WILLIAM H. HEATH
RONALD A. FINKLER
BY
ATTORNEY

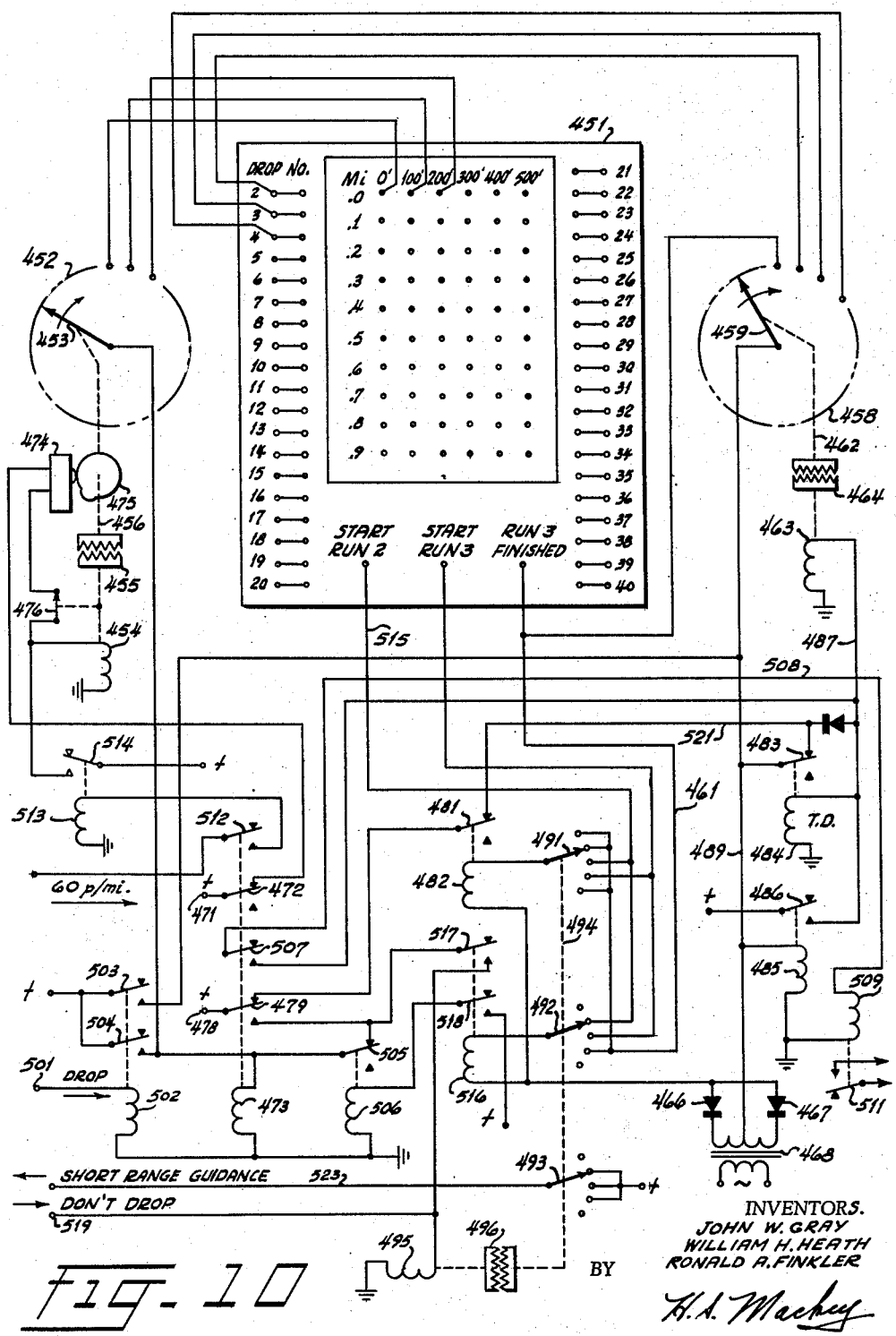

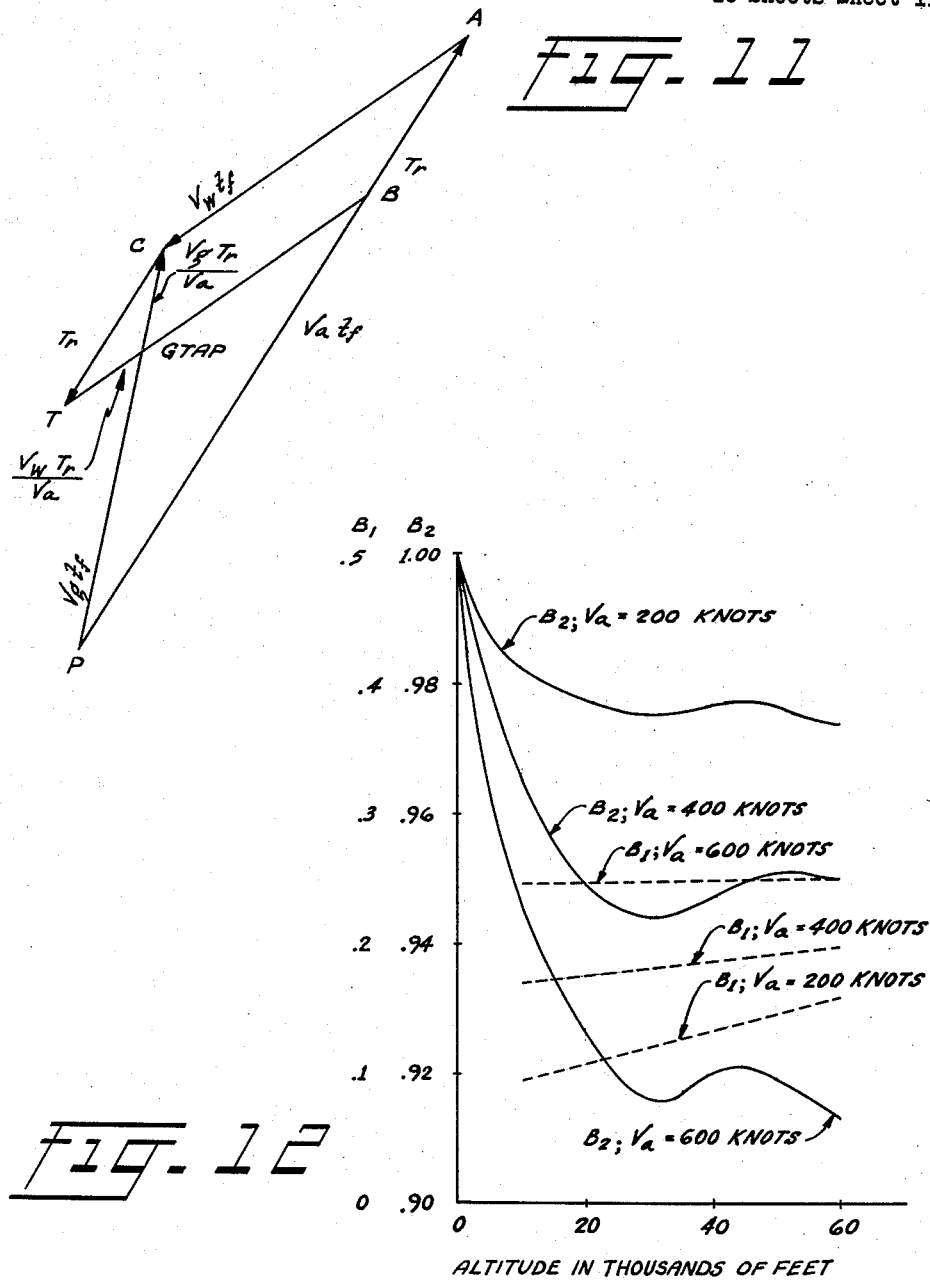

INVENTORS.
JOHN W. GRAY
WILLIAM H. HEATH
RONALD A. FINKLER
BY
ATTORNY

Oct. 22, 1963   J. W. GRAY ETAL   3,108,182
NAVIGATION SYSTEM
Filed April 3, 1957   15 Sheets-Sheet 13

INVENTORS.
JOHN W. GRAY
WILLIAM H. HEATH
RONALD A. FINKLER
BY
H. S. Mackey
ATTORNEY

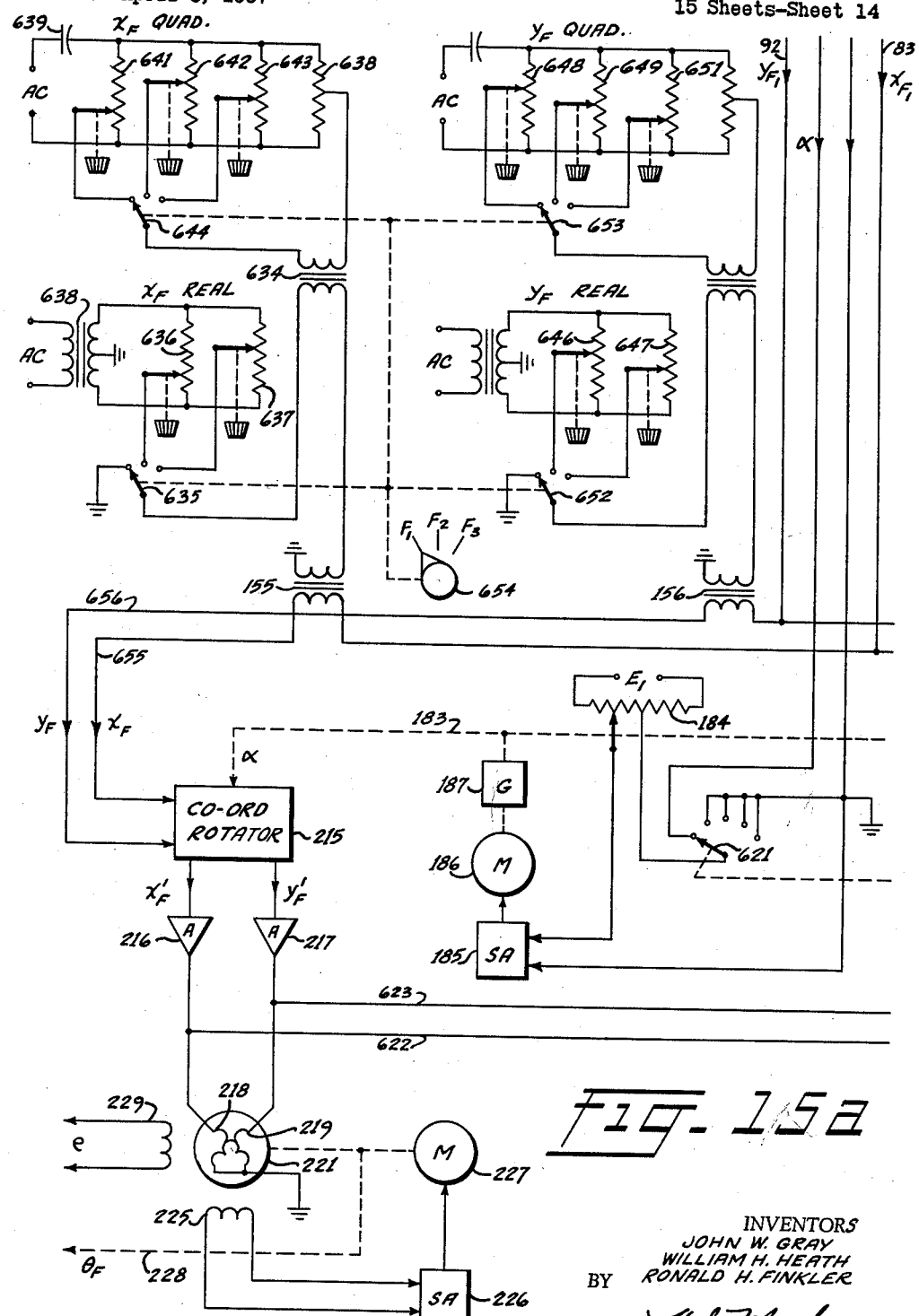

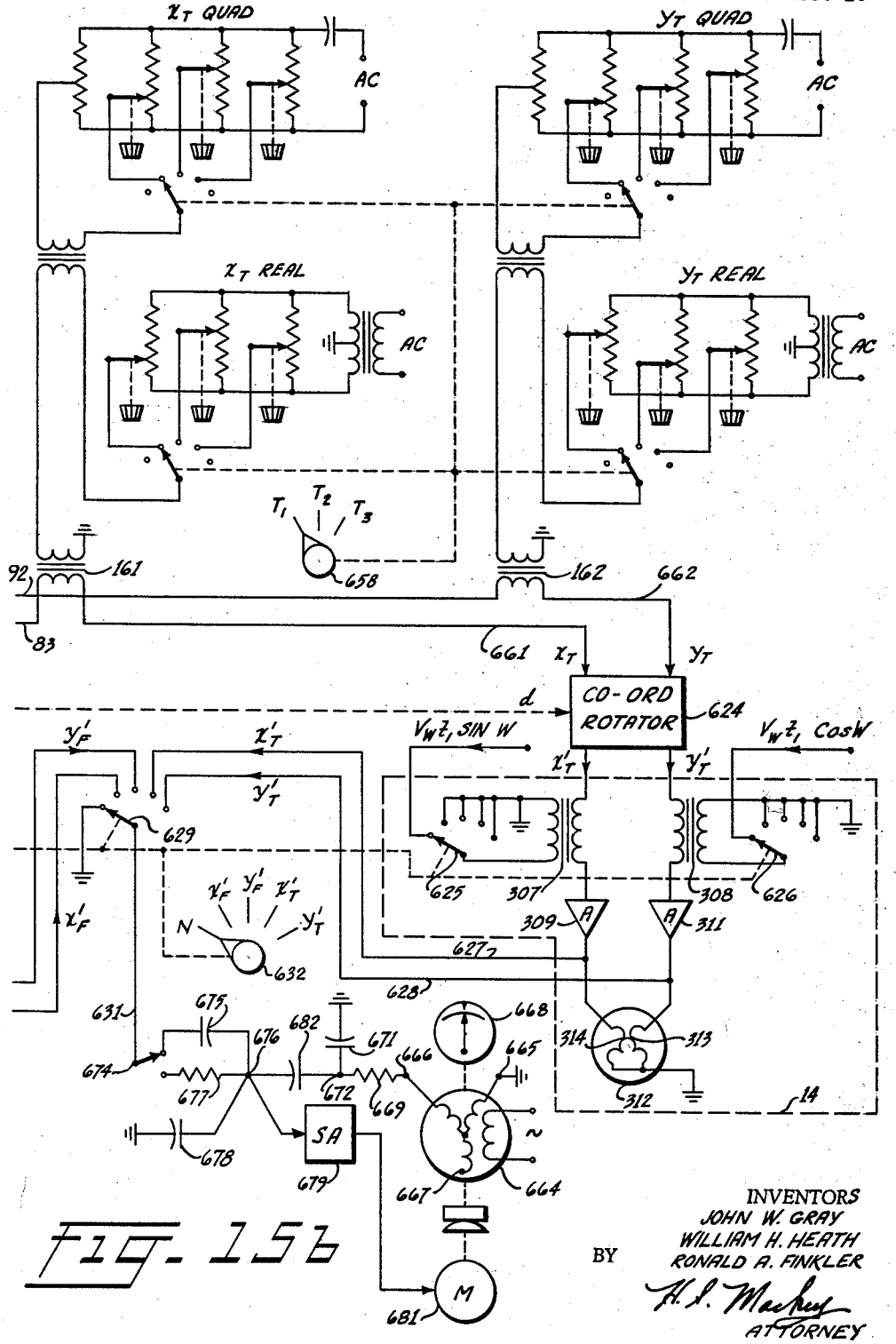

United States Patent Office 3,108,182
Patented Oct. 22, 1963

3,108,182
NAVIGATION SYSTEM
John W. Gray, William H. Heath, and Ronald A. Finkler, Pleasantville, N.Y., assignors to General Precision Inc., a corporation of Delaware
Filed Apr. 3, 1957, Ser. No. 650,532
23 Claims. (Cl. 235—61.5)

This invention relates generally to aircraft navigational equipment and particularly to equipment for navigating an aircraft during bombing or mine laying operations.

When an aircraft is to drop a missile on a single target, it is necessary first, that the aircraft be guided from its base to the vicinity of the target; second, that the position of the release point be determined; and third, that the aircraft be guided over this point.

Some operations may require an aircraft to drop missiles, not on a single point, but on a series of points lying on a straight line. For example, it may be required to place a series of mines along a navigable river or across the mouth of a harbor. Such an operation presents a more serious navigational problem than that of single point bombing because the aircraft must not only pass over the release point but must pass over it while on a definite straight line course parallel to the straight line along which the missiles are to be placed so that as missiles are released from time to time they will strike the earth at the desired locations.

The present invention contemplates the navigational equipment required to guide the aircraft from its base to the area of operations, to guide the aircraft so as to drop missiles along several lines in succession, and to provide signals for controlling the dropping of the individual missiles. An important part of the invention is the apparatus for guiding the aircraft so as to pass over each release point from the proper direction.

It is an object of this invention to provide apparatus for guiding an aircraft from any point on the surface of the earth to the vicinity of a group of targets and thereafter guiding the aircraft and providing suitable signals to enable missiles to be dropped from the aircraft upon a plurality of selected points lying on the same straight line.

It is another object of the invention to provide apparatus for computing the location on the earth of a desired straight line and for guiding the aircraft over the length of that line regardless of the direction from which the line is approached.

Another object of the invention is to provide apparatus for guiding an aircraft so as to enable a series of missiles dropped therefrom to fall on a predetermined straight line.

Yet another object is to provide apparatus for suitably guiding an aircraft and for producing a series of signals indicating the proper time to release missiles so as to fall on predetermined points on a straight line.

For a clearer understanding of the invention, reference may be made to the following detailed description and the accompanying drawing, in which.

Figure 5:
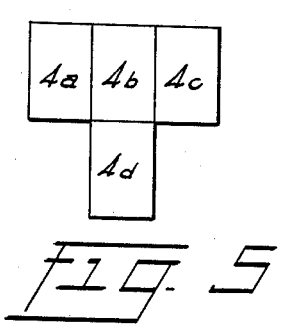
Figure 16:
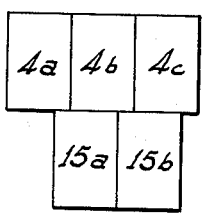
Figure 7A:
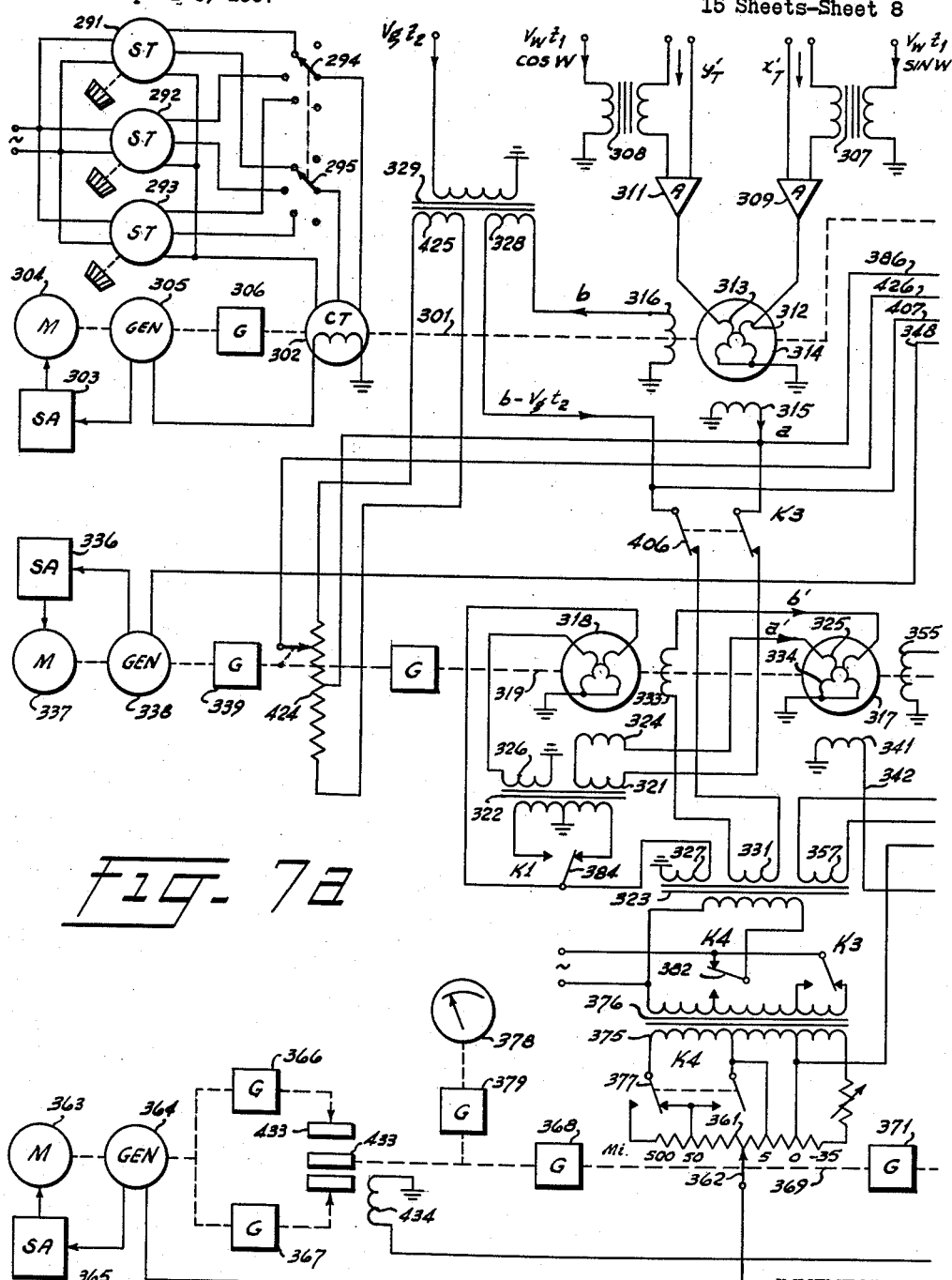
Figure 13:
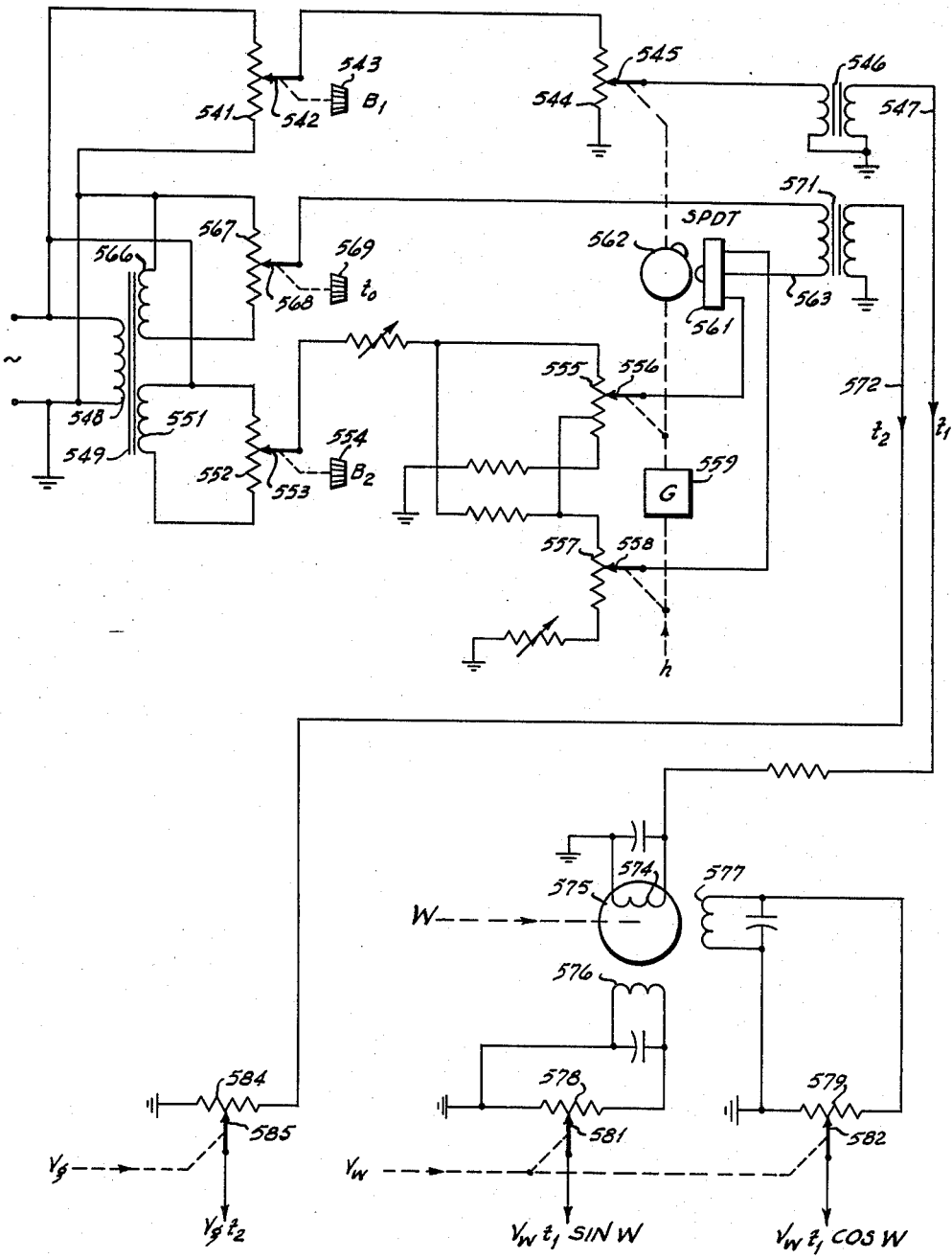
Figure 14:
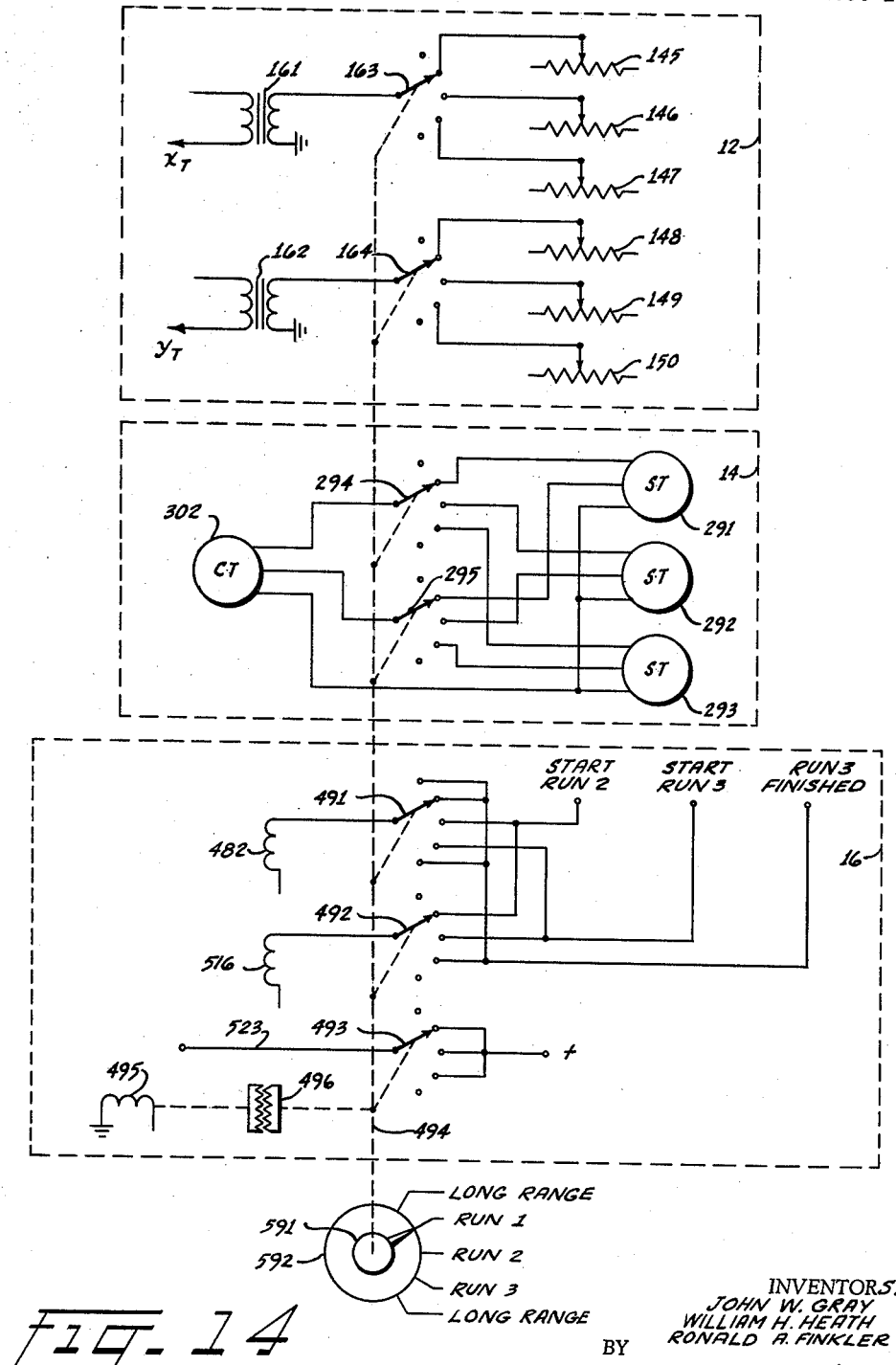

FIGURES 4a, 4b, 4c and 4d, taken together, are a schematic diagram of the coordinate computer;

FIGURE 5 indicates how FIGS. 4a, 4b, 4c and 4d should be joined together to form a single diagram;

FIGURES 6, 8 and 9 are diagrams useful in explaining the operation of the guidance computer;

FIGURES 7a and 7b, taken together, are a schematic diagram of the guidance computer;

FIGURE 10 is a schematic diagram of the intervalometer;

FIGURES 11 and 12 are diagrams useful in explaining the operation of the ballistics computer;

FIGURE 13 is a schematic diagram of the ballistics computer;

FIGURE 14 is a diagram showing the interrelation of certain elements also shown in various other figures;

FIGURES 15a and 15b, taken together, are a schematic diagram of a modification of the coordinate computer; and FIGURE 16 indicates how FIGS. 4a, 4b, 4c, 15a and 15b may be joined together to form a single diagram.

Figure 1:
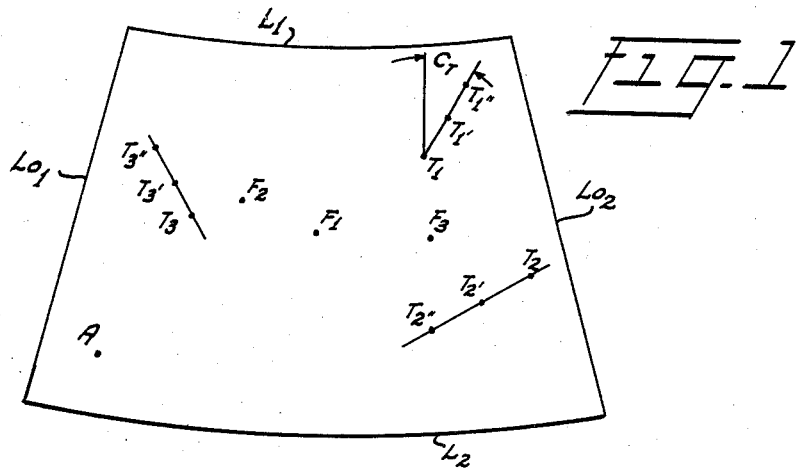
FIGURE 1 is a diagram useful in explaining the problem solved by the invention.

Referring first to FIGURE 1, an aircraft equipped in accordance with the invention is assumed to have flown from its base and to be presently in flight at some point A in the vicinity of one or more radar reference, or "fix" points such as $F_1$, $F_2$ and $F_3$, and several groups of targets, $T_1$, $T_2$ and $T_3$, each group comprising several individual targets such as $T_1$, $T_1'$ and $T_1''$ lying in the same straight line. All of the points A, $F_1$, $F_2$, $F_3$, $T_1$, $T_2$, and $T_3$ are assumed to be within a limited area on the order of three or four hundred miles square, the boundaries of which are represented by the meridians $Lo_1$ and $Lo_2$ and by the parallels $L_1$ and $L_2$. The convergence of the meridians and the curvature of the parallels are somewhat exaggerated in the figure for emphasis and clarity. The points $F_1$, $F_2$ and $F_3$ are points on the surface of the earth the latitudes and longitudes of which are known precisely and which show up clearly on the cathode ray tube of a radar set. As will be further explained, any of these points may be used to correct the latitude and longitude indications aboard the aircraft before the missiles are released. After such correction, the apparatus is required to guide the aircraft along the proper course so that missiles may be dropped successively on one group of targets, such as $T_1$, $T_1'$ and $T_1''$, whereupon guidance may be initiated to another group.

Figure 2:
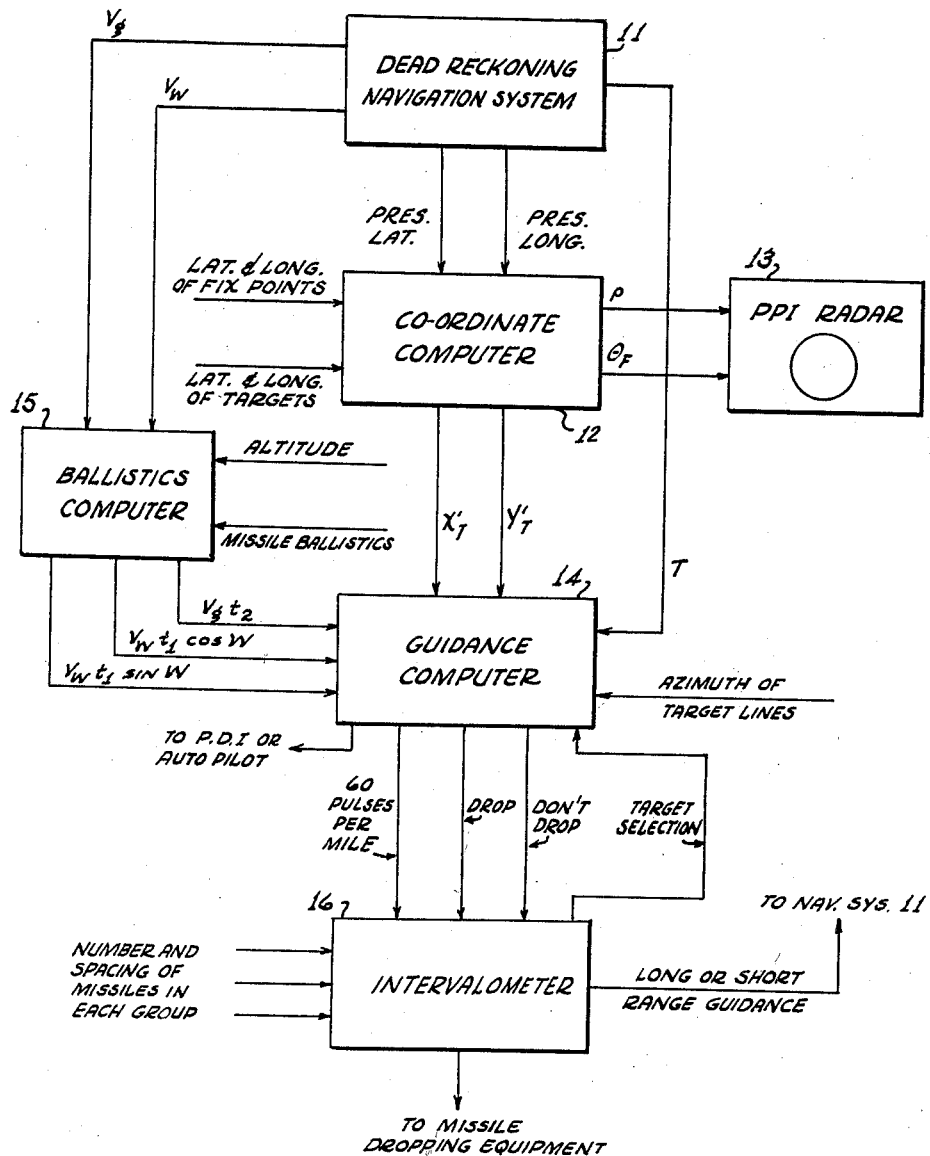
FIGURE 2 is a block diagram of the apparatus of the invention.

FIGURE 2 shows the apparatus of the invention in block diagram form. There is shown a dead reckoning navigation system 11 which, for the purposes of the present invention, may be any of several kinds, but which is preferably a completely airborne Doppler radar device. The system 11 must be constructed to provide continuous indications of present latitude, present longitude, ground speed and direction ($V_g$), wind speed and direction ($V_w$), and azimuth of ground track (T) of the aircraft. Suitable systems, with the exception of apparatus for computing the wind velocity, are described in the copending application of Tull and Gillette, Serial Number 749,184, filed May 20, 1947, for "Navigation System," now Patent No. 2,869,118 granted January 13, 1959, and in the copending application of Gray, Hales and Greenwood, Serial Number 410,882, filed February 17, 1954, for "World Wide Navigation System," now Patent No. 2,908,902 granted October 13, 1959. The wind computer may comprise an analog computer for solving continuously the vector triangle the sides of which are air velocity, ground velocity and wind velocity, and such a computer is described in the copending application of Gray and Tull, Serial Number 537,011, filed September 27, 1955 for Wind Computer, now Patent No. 3,007,338 granted November 7, 1961.

Indications of present latitude and present longitude are taken from the system 11 and fed into a coordinate computer 12 the function of which is twofold. First, it computes the coordinate distances from present position to the first target ($T_1$, $T_2$ and $T_3$) of each group of targets. Second, it computes the range and azimuth from present position to any of the fix points, $F_1$, $F_2$ and $F_3$, and passes signals indicative of these values to a radar system 13.

The radar system 13 is basically a conventional arrangement for displaying a "PPI" representation of the terrain beneath the aircraft on a cathode ray tube, but includes additionally the apparatus necessary for producing traces on its cathode ray tube in accordance with the range and azimuth signals received from the coordinate computer 12, which traces indicate the computed position of the fix point. Such apparatus is of conventional construction and may be similar to that described in the co-pending application of John W. Gray, Serial Number 36,214, filed June 30, 1948, for Navigational Fix Computer, now Patent No. 2,839,747, granted June 17, 1958. If the position of the fix point indicated by the above mentioned traces does not coincide with that indicated by the radar system acting independently, the indications of present latitude and present longitude may be adjusted until the indications do coincide, thus assuring the accuracy of the present latitude and longitude information used to compute the various coordinate distances.

The guidance computer 14 receives indications of the coordinate distances from present position to a selected one of the targets, such as $T_1$, certain ballistic information from a ballistics computer 15, and an indication of the azimuth of the ground track of the aircraft (T) from the navigation system 11. This information is combined with the azimuth angle $C_T$ of the selected target line and three outputs are derived. The first is an error signal which, when equal to zero, indicates that the aircraft is on the proper course, and may be used to operate a pilot's direction indicator or an autopilot. The second output is a voltage pulse generated when the distance to go to the point at which the first missile is to be released is zero. If the position and course of the aircraft are near enough to the ideal, this pulse becomes a "drop" pulse and is passed to the intervalometer 16 via a first channel. If the aircraft's position or course has too great an error, the pulse becomes a "don't drop" pulse and is passed to the intervalometer 16 via a second channel. The third output is a series of pulses, for example 60 per mile, which are passed to the intervalometer.

The ballistics computer 15 receives information indicative of ground velocity and wind velocity from the navigation system 11, altitude from the usual aircraft altimeter, and also has information manually inserted regarding the ballistic characteristics of the missiles to be released. Three voltage outputs are obtained, all of which are passed to the guidance computer 14. The first $V_g t_2$ represent the distance along the ground track from the ground track aiming point to the release point; the second and third represent the north-south and east-west components of the distance from the target to the ground track aiming point.

The intervalometer 16 receives the aforementioned pulses from the guidance computer 14, and also has information manually inserted regarding the number of missiles in each group and the desired spacing between missiles. Upon receipt of a "drop" pulse, the intervalometer sends a signal to the missile dropping mechanism and the first missile is released. Additional missiles are released in accordance with the preselected pattern. When the last missile of the first group has been released, a signal is sent to the guidance computer 14 and guidance to the next group of targets is initiated. The receipt of a "don't drop" signal generates a similar signal immediately, and the aircraft is guided to the next group of targets at once. When last missile of the last group has been released, a signal is sent to the navigation system 11, whereupon long range guidance back to the base is initiated.

Following the above brief description of the interrelation of the major components, the novel components themselves will now be described.

*The Coordinate Computer*

Figure 3:
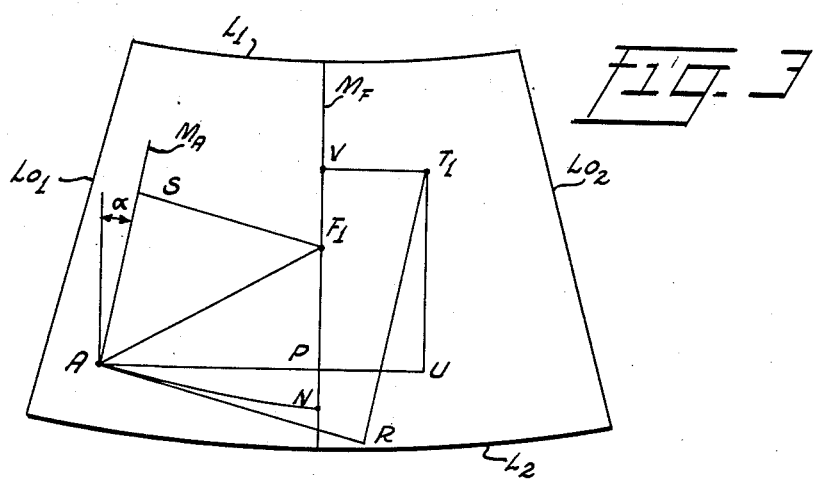
FIGURE 3 is a diagram useful in explaining the operation of the coordinate computer.

FIG. 3 illustrates the geometrical aspects of the computations performed by the coordinate computer. As in FIG. 1, A represents the present position of the aircraft, $F_1$ one of the fix points, and $T_1$ one of the targets. As previously stated, the coordinate computer is required to compute continuously the coordinates of each fix point and each target, referred to a system of planar rectangular coordinates the origin of which at A and the Y axis of which is the meridian $M_A$ through A. In FIG. 3, $SF_1$ and AS are the desired coordinates of $F_1$ and will be designated $x'_{F_1}$ and $y'_{F_1}$, while AR and $RT_1$ are the desired coordinates of $T_1$ and will be designated $x'_{T_1}$ and $y'_{T_1}$. Similar coordinates are also computed for the remaining fix points and targets.

The computation is made by first computing the rectangular coordinates of the prime fix point, $F_1$, with respect to a coordinate system having its origin at A and the Y axis of which is parallel to the meridian $M_F$ through $F_1$. In FIG. 3, these coordinates are AP and $PF_1$, and will be designated $x_{F_1}$ and $y_{F_1}$ respectively. Present position changes continuously and therefore these coordinates must be computed continuously.

The north-south and east-west distances, or "offsets," from $F_1$ to each of the other fix points ($F_2$ and $F_3$) and to each target ($T_1$, $T_2$ and $T_3$) are also determined, but need be determined only once, since they do not vary with present position. One of these points, $T_1$, is shown in FIG. 3 and its offsets are $VT_1$ and $F_1V$. These offsets may be added to the coordinates of $F_1$ to obtain the coordinates of $T_1$ which are AU and $UT_1$ and will be designated $x_{T_1}$ and $y_{T_1}$ respectively. The coordinates of the remaining fix points and targets, $F_2$, $F_3$, $T_2$ and $T_3$, are computed in the same fashion. The desired coordinates, $x'_{F_1}$, $y'_{F_1}$ and $x'_{T_1}$, $y'_{T_1}$ are derived from $x_{F_1}$, $y_{F_1}$, and $x_{T_1}$, $y_{T_1}$ by rotating the coordinate system through the angle $\alpha$.

Figure 4A:
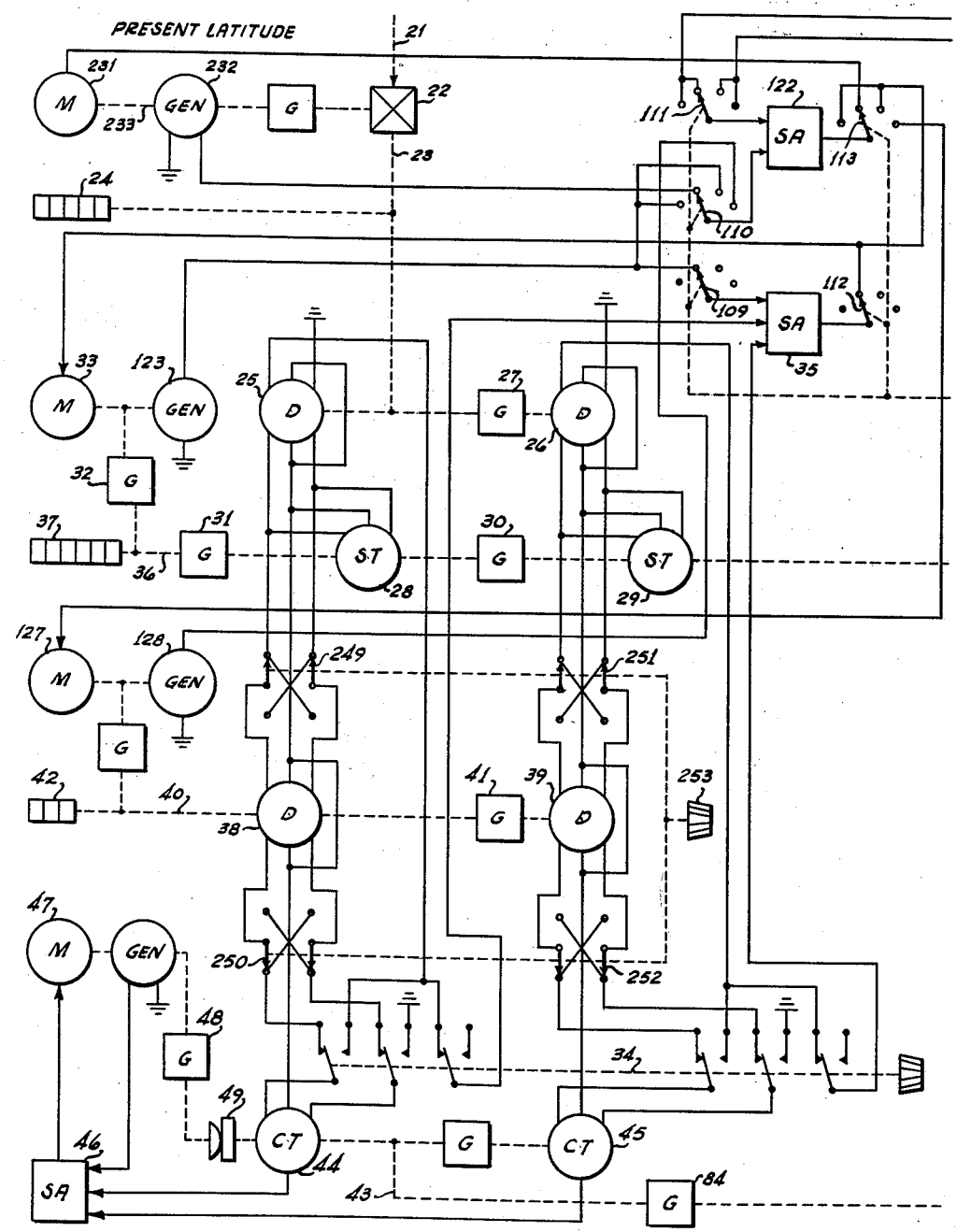

Referring now to FIG. 4a, information regarding present latitude is received from the navigation system 11 as the position of shaft 21. This shaft is connected to a mechanical differential 22 the purpose of which will be explained later. The output of this differential is taken from shaft 23 to which is connected a mechanical counter 24 which indicates visually the present latitude of the aircraft at all times. The computations to be performed require highly precise latitude information and accordingly shaft 23 is connected to two differential synchros 25 and 26 which normally operate as control transformers. The differential synchros 25 and 26 are connected together through suitable gearing 27 so as to operate as conventional high and low speed synchros. The differential 22, the counter 24 and the two differential synchros 25 and 26 may, if desired, be physically located within navigation system 11 but since their function is concerned with the operation of the coordinate computer they will be considered as parts of this computer for the purpose of explaining the operation.

The three-wire outputs from the stators of the differential synchros 25 and 26 are connected to the stators of synchro transmitters 28 and 29 respectively, the shafts of which are joined through suitable gearing 30. It will be understood that the rotor windings of synchro transmitters 28 and 29 are connected to a source of alternating current, but these connections as well as many other conventional connections have been omitted from the drawing in the interest of clarity. The shaft of synchro transmitter 28 is connected through gear boxes 31 and 32 to the shaft of motor 33. Error signals from differential synchros 25 and 26 are passed via a six-pole switch 34 about which more will be said later, to a servo amplifier 35 the output of which is connected to the motor 33 so as to position the shaft 36 precisely in accordance with present latitude. A precise mechanical counter 37 is connected to the shaft 36 to enable present latitude to be read accurately. For the present, it will be assumed that all the switches shown in FIGS. 4a, 4b and 4c are in the positions shown in the drawing.

The three-wire outputs from the stators of transmitting synchros 28 and 29 are also connected to differential synchros 38 and 39 respectively. The shaft 40 of the differential synchro 38 is connected through a gear box 41 to the synchro 39 and is positioned, as will be more fully explained, to correspond to the latitude of the prime fix point $F_1$. A mechanical counter 42, which need not contain as many drums as a counter 24, is provided to aid in positioning the shaft 40. The three-wire outputs of the differential synchros 38 and 39 will therefore be a representation of the difference in latitude between the present position of the aircraft and the prime fix point $F_1$. This three-wire information is converted to the position of a shaft 43 by connecting the differential synchros 38 and 39 to control transformers 44 and 45 respectively, the error signal from which serves as the input to a servoamplifier 46 which, in turn, drives a motor 47 connected through suitable gearing 48 to the shaft 43. As will be discussed subsequently, the shaft 43 positions a multiturn potentiometer which has a limited mechanical rotation and therefore a slip clutch 49 is provided in the servomotor gear train.

Figure 4C:
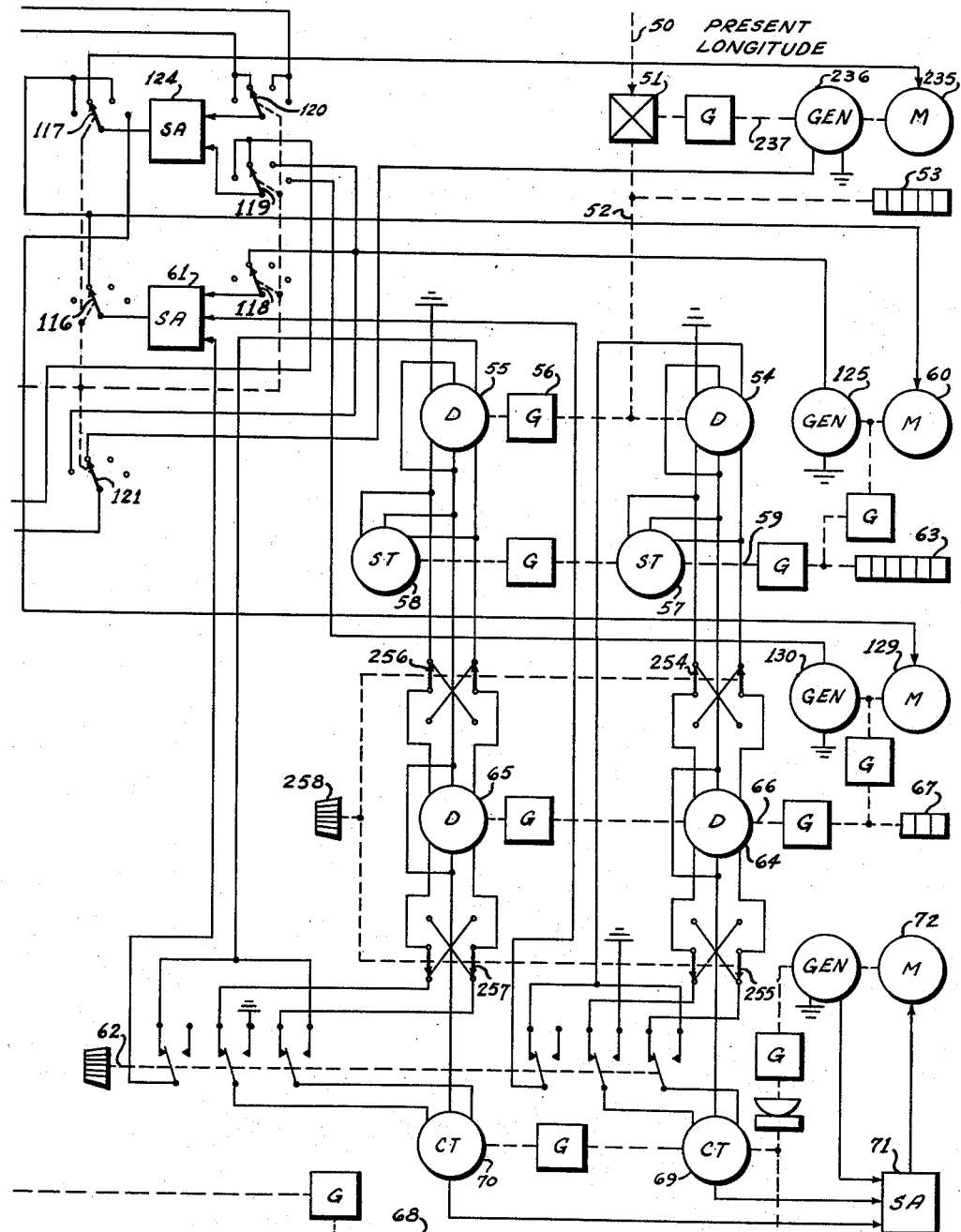

Referring now to FIG. 4c, information as to the present longitude of the aircraft is received from the navigation system 11 as the position of a shaft 50, which is connected to a mechanical differential 51, operation of which will be explained later. The output of the differential 51 appears on a shaft 52 which is connected to a mechanical counter 53 for displaying present longitude and is also connected to two differential synchros 54 and 55. These synchros are also normally connected so as to operate as control transformers and have their shafts connected through suitable gearing 56 so as to operate as conventional high and low speed synchros. The three-wire outputs of differential synchros 54 and 55 are connected to the stators of synchro transmitters 57 and 58 respectively, the shaft 59 of which is positioned by a motor 60, controlled by a servoamplifier 61, the input of which is obtained from the differential synchros 54 and 55 via a six-pole switch 62. A precise mechanical counter 63 is also connected to the shaft 59 in order to display accurately the aircraft's present longitude.

The three-wire outputs from synchros 57 and 58 are also connected to differential synchros 64 and 65 respectively, rotors of which are positioned through the shaft 66 in accordance with the longitude of the prime fix point $F_1$. A mechanical counter 67 is also connected to the shaft 66 to aid in positioning this shaft as will be more fully explained. The three-wire outputs of differential synchros 64 and 65 represent the difference in longitude between the aircraft's present position and the prime fix point $F_1$ and this information is converted to the position of the shaft 68 by connecting the outputs to the stators of control transformers 69 and 70 through the switch 62. The voltages induced in the rotors of control transformer 69 and 70 serve as inputs to a servoamplifier 71 which, in turn, drives a motor 72 the shaft of which is mechanically connected to the shaft 68.

The apparatus so far described yields the difference in latitude between the aircraft's present position and the prime fix point $F_1$ in the form of the position of the shaft 43 and the difference in longitude between the aircraft's present position and the prime fix point $F_1$ in the form of the position of the shaft 68.

Referring now to FIG. 3, the $x$ coordinate of the prime fix point $F_1$, designated $x_{F_1}$, is seen to be equal to AP. It is sufficiently accurate to regard this distance as being equal to the length of the arc AN. This length is equal to the difference in longitude times the cosine of present latitude or stated mathematically, $$x_{F_1} = (Lo_{F_1} - Lo_A) \cos L_A$$

In order to solve this equation an inductive resolver 73 (FIG. 4b) has its rotor winding excited from a source of alternating current $E_1$ which is of constant voltage except for a small factor to correct for the ellipticity of the earth as will be more fully described subsequently. Its shaft is mechanically connected to the shaft 36 through several gear boxes 31, 30, 74 and 75 so that the rotor is positioned in accordance with the present latitude of the aircraft $L_A$.

The voltage induced in one stator winding 76 is therefore proportional to cosine $L_A$ and a voltage equal thereto is impressed across the extremities of potentiometer 77, as follows. The voltage across potentiometer 77 is subtracted from the voltage of winding 76 by means of a transformer 78 and the difference in these voltages serves as the input to a servoamplifier 79, the output of which operates a motor 80. A source of alternating current is connected across the extremities of a potentiometer 81 and the slider of this potentiometer and one extremity are connected to the primary winding of a transformer 82. The transformer 82 has a secondary winding the center tap of which is grounded and the extremities of which are connected across the potentiometer 77. The shaft of the motor 80 is mechanically connected so as to adjust the slider of the potentiometer 81. It is obvious from the drawing that the motor 80 will adjust the slider until the input to the servoamplifier 79 is zero which can occur only if the voltage across the potentiometer 77 is equal to the voltage of the winding 76, which voltage it will be recalled, is proportional to cosine $L_A$. The slider of potentiometer 77 is positioned by the shaft 68 (FIG. 4c) in accordance with the difference in longitude $Lo_{F_1} - Lo_A$. The potential on conductor 83, between the slider and the grounded center tap of potentiometer 77 is therefore proportional to $x_{F_1}$.

Referring again to FIG. 3, it is seen that the $y$ coordinate $y_{F_1}$ is equal to $F_1N - PN$. $F_1N$ is equal to the difference in latitudes, $L_{F_1} - L_A$ and it can be shown that PN is equal to $$\frac{(Lo_{F_1} - Lo_A)^2 \sin 2L_A}{4}.$$

Referring back to FIG. 4a, the position of the shaft 43 is representative of the difference in latitudes and this shaft position is converted to a voltage proportional to $F_1N$ by connecting the shaft 43 through a suitable gear box 84 to the slider of a potentiometer 85 (FIG. 4b), the center tap of which is grounded and which has an alternating voltage $E_2$ connected to its extremities. This voltage $E_2$ is also constant except for a small correction for the ellipticity of the earth which will be more fully described. The potential of the slider of potentiometer 85 is therefore proportional to the difference in latitudes, $L_{F_1} - L_A$.

A voltage proportional to PN is obtained by means of potentiometers 86 and 87, the sliders of both of which are mechanically connected to the shaft 68 so as to be positioned in accordance with the difference in longitudes $Lo_{F_1} - Lo_A$. A resolver 88 has its rotor winding connected to a source of alternating current and its shaft connected through the gear box 74 to the shaft 36 so as to be positioned in accordance with twice the present latitude, $2L_A$. A voltage proportional to $\sin 2L_A$ is obtained from a first stator winding 89 and is applied across potentiometer 86. Since the slider of potentiometer 86 is positioned in accordance with the difference in longitudes the potential between the slider and the center tap will be proportional to $\sin 2L_A$ times the difference in longitudes. This potential is transferred by means of a transformer 90 to the extremities of potentiometer 87 so as to be again multiplied by the difference in longitudes. The potential between the slider and the center tap of potentiometer 87 is therefore proportional to $$\frac{(Lo_{F_1} - Lo_A)^2 \sin 2L_A}{4}$$

and is substracted from the potential of the slider of potentiometer 85 by means of a transformer 91. The potential of conductor 92 is therefore proportional to $y_{F_1}$.

Earth Ellipticity Corrector

If the earth were regarded as spherical, the voltages $E_1$ and $E_2$ (applied to the rotor of resolver 73 and to potentiometer 85 respectively) could be constant voltages and the computer would operate properly. A better approximation is to regard the earth as an ellipsoid and it is preferred to correct for ellipticity by modifying $E_1$ and $E_2$ accordingly. Correction for the ellipticity of the earth is fully described in the copending application of John W. Gray, Serial No. 494,505, filed March 15, 1955, for Earth Ellipticity Corrector for Dead Reckoning Computer, now Patent No. 2,843,318, granted July 15, 1958, and will be but briefly described in the present application.

As explained more fully in the aforementioned copending application the ellipticity corrections for latitude and longitude are each proportional to cosine $2L_A$. A second stator winding 93 of the resolver 88 produces a voltage proportional to cosine $2L_A$, and is connected to the primary of a transformer 94 which is provided with two secondary windings 95 and 96. Another transformer 97 has its primary winding connected to a source of alternating current and is provided with two secondary windings 98 and 99. Windings 95 and 98 are connected in series to provide the output voltage $E_1$ while windings 96 and 99 are connected in series to provide the output $E^2$.

The turns ratios and primary voltages of transformers 94 and 97 are selected to provide the proper correction and as a result the voltages $E_1$ and $E_2$ are each nearly constant, the correction contributed by windings 95 and 96 being in each case less than one percent at their maximum values.

Slew Control

The operation of the coordinate computer requires certain shafts to be positioned manually and the manner in which this is accomplished will now be described. Referring to FIG. 4b, a pair of miniature synchros 101 and 102 having rotor windings 103 and 104 respectively and stator windings 105 and 106 are connected as induction potentiometers and have their rotors connected to be manually operated by knobs 107 and 108. The voltages induced in the respective secondaries are therefore roughly proportional to the mechanical displacement of the knobs 107 and 108. If desired these knobs could be geared together to be operated by a single "joy-stick" so that displacement up and down would induce a voltage in winding 105 while displacement to the right or left would induce a voltage in winding 106. However, this is not necessary and the displacements will be regarded as being obtained independently. It is, however, preferred that both rotors be spring biased to return to their neutral positions when their knobs are released.

Thirteen four-position switches 109, 110, 111, 112, 113, 114, 115, 116, 117, 118, 119, 120 and 121 are shown in FIGS. 4a, 4b and 4c. All of these switches are mechanically connected together for simultaneous operation by means of a slew control knob 122. Discussion of the operation of these switches when in their first, or reconnaissance position, will be discussed later. In the second position, the position shown in the drawing, the switch 112 connects the servoamplifier 35 to the motor 33 and switch 116 connects the servoamplifier 61 to the motor 60 in order to position the shafts 36 and 59 in accordance with present latitude and present longitude as previously explained. The effect of the remaining switches in this position will be discussed when the method of adjusting present position in accordance with a radar fix point is discussed.

When the switches are in their third position and the knob 107 is displaced, the voltage induced in winding 105 is connected through the switch 111 to the input of servoamplifier 122, the output of which passes through switch 113 and operates the motor 33. A generator 123 on the same shaft as motor 33 also has its output connected to the input of the servoamplifier 122 through the switch 110. The voltage induced in winding 106 is connected to the input of a servoamplifier 124 through the switch 120. A generator 125 on the same shaft as the motor 60 is also connected to the input of the servoamplifier 124 through the switch 119. The output of the servoamplifier 124 is connected to the motor 60 through the switch 117. As a result, when the knobs 107 and 108 are displaced the motors 33 and 60 will turn at rates approximately proportional to the amount of the displacement of the knobs 107 and 108. One of the purposes of these connections is to enable the counters 37 and 63 to be set to correspond with the counters 24 and 53 at the start of the mission. Other purposes will be explained subsequently.

In the fourth position, the winding 105 is connected through the switch 111 to the input of the servoamplifier 122. The output of the servoamplifier 122 is connected through the switch 113 to control a motor 127 to position the shaft 40. A generator 128 on the same shaft as the motor 127 also is connected to the input of the servoamplifier 122 through the switch 110. Similarly, the winding 106 is connected through switch 120 to the input of the servoamplifier 124 the output of which is connected through switch 117 to control a motor 129 which in turn positions the shaft 66. A generator 130 on the same shaft as motor 129 is also connected to the input of the servoamplifier 124 through the switch 119. The purpose of this fourth, or "prime fix" position is to enable the latitude and longitude of the prime fix point $F_1$ to be set into the counters 42 and 67.

Target and Alternate Fix Point Coordinates

So far we have described the computation of the coordinates of the prime fix point $F_1$. Now the method of obtaining the coordinates of the targets and the alternate fix points will be explained. As previously stated these coordinates are obtained by adding to the coordinates of the prime fix point $F_1$ voltages representing offsets of the various other points. As shown in FIG. 4d, ten potentiometers 141, 142, 143, 144, 145, 146, 147, 148, 149 and 150 are connected in parallel across a source of alternating current obtained from a transformer 152 having a secondary, the center tap of which is grounded, and the primary of which is connected to an alternating current source. These potentiometers should have very high resolution and stability, but need not be highly linear nor need there be any indicating dials associated with the adjustment knobs. A pair of three position switches 153 and 154 are mechanically connected for simultaneous operation. The movable arm of switch 153 is connected to one terminal of the primary of a transformer 155, the other terminal being grounded. Similarly, the movable arm of switch 154 is connected to one terminal of the primary of a transformer 156, the other terminal being grounded. The first contact of each switch is grounded, so that when the switches are in the first position, no voltage is impressed on the primary of transformers 155 and 156. The second and third contacts of switch 153 are connected to the sliders of potentiometers 142 and 141 respectively, while the second and third contacts of switch 154 are connected to the sliders of potentiometers 144 and 143 respectively. It is obvious that, when the switches 153 and 154 are in their second or third positions, the transformers 155 and 156 will have voltages impressed on their primaries depending upon the positions of the sliders of the selected potentiometers. The first, second and third positions correspond to the selection of fix points $F_1$, $F_2$, and $F_3$ respectively. The secondary of transformer 155 is connected in series with the conductor 83, the potential of which, it will be recalled, is proportional to $x_{F_1}$ so that the potential on conductor 157 is that of the conductor 83 modified by an amount determined by the position of the switch 153 and the position of the sliders of the potentiometers 141 and 142. Similarly, the secondary of transformer 156 is connected in series with conductor 92 so that the potential of conductor 158 is that of conductor 92 modified by an amount determined by the position of switch 154 and the positions of the sliders of potentiometers 143 and 144.

In a similar fashion, transformers 161 and 162 together with switches 163 and 164 permit voltages to be subtracted from conductors 83 and 92 in accordance with the positions of sliders of potentiometers 145–150 so that the potentials of conductors 165 and 166 represent the coordinates of the selected target. Four voltmeters 171, 172, 173 and 174 are connected between conductors 157, 158, 165 and 166 respectively and ground so that it may be determined when the potentials on conductors 157, 158, 165 and 166 are zero. The procedure for setting the sliders of potentiometers 141–150 will now be explained.

It is first necessary to adjust the apparatus so that conductors 83 and 92 have the proper potential to represent correctly the coordinates of the prime fix point $F_1$. The switches 153 and 154 are set to their first position so that no voltage is impressed across the primaries of transformers 155 and 156. The slew control knob 122 (FIG. 4b) is now moved to its third, or "set up" position and the knobs 107 and 108 displaced causing motors 33 and 60 to rotate, until counters 37 and 63 display the exact latitude and longitude of the prime fix point $F_1$. This amounts to pretending to fly the aircraft to the prime fix point because counters 36 and 63 are normally used to display present latitude and longitude. When the aircraft is at the prime fix point the coordinates are, of course, zero. Therefore, if we adjust the shafts 40 and 66 until the coordinates are zero, then the shafts 40 and 66 must necessarily be positioned precisely at the latitude and longitude respectively of the prime fix point, $F_1$.

To so position the shafts 40 and 66, and the counters 42 and 67, the knob 122 is moved to its fourth, or "prime fix" position so that displacements of the knobs 107 and 108 will cause motors 127 and 129 to adjust the counters 42 and 67. These counters are now rotated until meters 171 and 172 indicate zero. It will be recalled that counters 41 and 69 are not as precise as counters 36 and 63 and therefore it may be possible to rotate motors 128 and 132 a substantial amount without affecting counters 41 and 69. When the meters 171 and 172 read zero, the shafts 40 and 66 will be set to the latitude and longitude respectively of the prime fix point $F_1$.

The knob 122 is now turned to its third, or "set up" position and the knobs 107 and 108 displaced until the counters 37 and 63 display the latitude and longitude of the second fix point $F_2$. Switches 153 and 154 are next turned to the "$F_2$" position and the sliders of potentiometers 142 and 144 are adjusted until the meters 171 and 172 again indicate zero. It will be noted that we have now pretended to fly the aircraft to the point $F_2$ at which point its coordinates are, of course, zero. Once the sliders of potentiometers 142 and 144 have been set, no further adjustment is necessary.

In a similar manner the sliders of the remaining potentiometers are adjusted by pretending to fly the aircraft to the remaining fix point $F_3$ and to each of the targets $T_1$, $T_2$ and $T_3$.

Coordinate Rotation

It will be noted that the coordinates so far computed are $x_F$, $y_F$ and $x_T$, $y_T$, and these coordinates must be rotated through the angle $\alpha$ in order to obtain the desired coordinates $x'_F$, $y'_F$ and $x'_T$, $y'_T$. The resolver 73 (FIG. 4b) is connected to the shaft 36 so as to be rotated in accordance with present latitude. A second stator winding 181 at right angles to the winding 76 would therefore have induced in it a voltage proportional to sin $L_A$ if its rotor were connected to a source of constant voltage. The source $E_1$ to which the rotor is connected is nearly constant and, for the present, we will consider it so. It can be shown that the angle $\alpha$ (FIG. 3) is equal to $$(Lo_{F_1} - Lo_A) \sin L_A$$

The stator winding 181 is therefore connected across the extremities of a potentiometer 182 the slider of which is connected to the shaft 68 so as to be positioned in accordance with $Lo_{F_1} - Lo_A$ so that the voltage between the slider and the center tap is proportional to the angle $\alpha$. This voltage is converted to the position of a shaft 183 (FIG. 4d) by means of a potentiometer 184, a servoamplifier 185 and a motor 186 which is mechanically connected through suitable gearing 187 to the slider of the potentiometer 184. The voltage between the slider and the center tap of potentiometer 182 is balanced against that between the slider and center tap of potentiometer 184 and the difference between these voltages constitutes the error signal to servoamplifier 185. The voltage $E_1$ is connected across the extremtities of potentiometer 184.

It will be recalled that the resolver 73 has the voltage $E_1$ impressed on its rotor winding and since this voltage is not constant an error is introduced in the determination of the angle $\alpha$ by the potentiometer 182. However, this error is completely compensated by exciting the potentiometer 184 with a like voltage $E_1$. It would, of course, be possible to provide an additional resolver on the shaft 36 and to connect its rotor to a source of constant voltage and use this resolver to determine the angle $\alpha$ in which case the potentiometer 184 would also have a source of constant voltage impressed across its extremities. However, the resolver 73 is required for other purposes and the expedient of exciting potentiometer 184 with a voltage equal to $E_1$ eliminates the necessity for an additional resolver.

The standard equations for the rotation of coordinates are $$x' = x \cos \alpha + y \sin \alpha$$
$$y' = y \cos \alpha - x \sin \alpha$$

For the purposes of the present invention, any type of coordinate rotator could be employed. However, in the present case, the angle $\alpha$ is always very small, never exceeding three degrees, and in this case it is preferred to use a rotator employing the approximate equations $$x' = x + \frac{y+y'}{2}\alpha$$
$$y' = y - \frac{x+x'}{2}\alpha$$

These equations permit the use of a simple instrumentation which is extremely accurate for small angles and has the advantage that when $\alpha = 0$, there is no instrumentation error whatever. Such a coordinate rotator is fully described in the copending application of John W. Gray, Serial Number 491,619, filed March 2, 1955, for Cordinate Rotator, now Patent No. 2,940,671, granted June 14, 1960, and will be but briefly described herein.

The conductor 165 whose voltage represents $x_T$ is connected to one input terminal 191 and the conductor 166 whose voltage represents $y_T$ is connected to the other input terminal 192. Considering first the $x$ coordinate, the voltage representing $x_T$ is amplified by an amplifier comprising triodes 193 and 194, the output of which appears on the primary winding 195 of the transformer 196. This transformer is provided with three secondary windings 197, 198 and 199 each of which have induced therein voltages proportional to $x_T$. The winding 197 is used to provide a high degree of negative feedback so that the input is substantially unloaded. A switch 201 in the feedback circuit allows the adjustment of the gain of the amplifier for the purpose of changing the scale factor, which purpose will become more apparent when the guidance computer is described. The output $x'_T$ consists of the voltage of secondary winding 198 modified by a portion of the voltage across a potentiometer 202.

In a similar fashion, the potential of terminal 192 is amplified by two triodes 203 and 204, voltages proportional to $y_T$ appearing on secondary windings 206, 207 and 208. The winding 208 is used to provide negative feedback and a switch 209 is provided for the purpose of adjusting scale factors. The output $y'_T$ comprises the voltage of winding 207 modified by a portion of the voltage across a potentiometer 211.

The potentiometer 202 has connected across its extremities, a voltage made up of the sum of the voltage of winding 206 and the voltage from the secondary of a transformer 212. The voltage of winding 206, as previously stated, is proportional to $y$. The primary of transformer 212 is connected between the slider of potentiometer 211 and its midpoint and the turns ratio is such that the secondary voltage is proportional to $$\frac{y'-y}{2}$$

The voltages from the winding 206 and the secondary of transformer 212 are added so that the voltage across potentiometer 202 is proportional to $$\frac{y+y'}{2}$$

and this voltage is multiplied by $\alpha$ since the slider of potentiometer 202 is connected to the shaft 183. In a similar fashion there is impressed across potentiometer 211 a voltage proportional to $$\frac{x+x'}{2}$$

which voltage is multiplied by $\alpha$ and subtracted from the voltage of winding 207 to obtain the desired output $y'_T$. As shown in FIG. 2, $x'_T$ and $y'_T$ are passed to the guidance computer 14.

The coordinates of the selected fix point $x_F$ and $y_F$ are similarly rotated by connecting conductors 157 and 158 to the inputs of a coordinate rotator 215 which may be similar to the coordinate rotator described above. The shaft 183 is extended to provide a mechanical displacement indicative of the angle $\alpha$. The outputs of the rotator 215, $x'_F$, $y'_F$, are connected through booster amplifiers 216 and 217 respectively to the rotor windings 218 and 219 respectively of a resolver 221. One of the stator windings 225 serves as the input to servo-amplifier 226 which drives a motor 227, the shaft 228 of which is connected to the rotor of the resolver 221. The motor 227 turns the shaft until the voltage of winding 225 is zero at which time the shaft 228 is at an angle $\theta_F$ which represents the azimuth of the fix point. The other rotor winding 229 will, of course, have induced in it a voltage proportional to the range $\rho$. This voltage proportional to $\rho$ and the shaft position proportional to $\theta_F$ are utilized by the radar system 13 to generate traces on the cathode ray tube proportional to $\rho$ and $\theta$, respectively.

*Present Position Adjustment*

It will be recalled that the purpose of these traces is to determine whether there is any difference in the position of the fix point as computed by the foregoing apparatus and the position of the same point as determined by the radar system 13 acting independently. If there is a difference, the indications of present latitude and present longitude as received from the navigation system 11 are adjusted until the two position indications coincide. It would be possible to adjust the indications of latitude and longitude independently until the traces coincided with the position determined by the radar system 13 but such a procedure would be difficult and time consuming. It is preferred to provide means for adjusting present latitude and present longitude simultaneously so that the range trace alone or the azimuth trace alone is moved. In the present apparatus an arrangement is employed which is similar to that described in the aforementioned copending application Serial Number 36,214, now Patent No. 2,839,747.

The actual adjustment of the latitude indicators 24 and 37 (FIG. 4a) is accomplished by means of a rate servo comprising servoamplifier 122, a motor 231 and an induction generator 232, the latter generating a voltage proportional to its speed of rotation. The motor 231 and generator 232 are mounted on a common shaft 233 which is connected to the differential 22. Therefore, rotations of the shaft 233 are added to or subtracted from that of shaft 21 to alter the indications of counters 24 and 37.

The longitude indicators 53 and 63 (FIG. 4c) are adjusted by means of another rate servo which comprises servo-amplifier 124, a motor 235 and an induction generator 236 similar to the generator 232. The motor 235 and the generator 236 are mounted on a common shaft 237 which is connected to the differential 51 so that rotations of the shaft 237 are added to or subtracted from those of the shaft 50, thus adjusting the indications of counters 53 and 63.

A resolver 241 (FIG. 4b) comprising mutually perpendicular rotary windings 242 and 243 and mutually perpendicular stator windings 244 and 245 has its rotor connected to the shaft 228 which, it will be recalled, is positioned in accordance with the azimuth angle $\theta_F$ of the fix point. The knob 107, connected to the induction potentiometer 101, can be used to adjust present latitude and present longitude simultaneously so as to cause the range trace only to move. It will be recalled that displacement of the knob 107 causes a voltage to be induced in the stator winding 105 which is roughly proportional to the displacement of the knob 107. When the slew control knob 122 is in its second, or "normal" position, as shown in the drawing, this voltage is impressed on the rotor winding 243 of the resolver 241. This voltage represents the rate of which it is desired to add or subtract from the range trace and is resolved into north-south and east-west components by the resolver 241. The voltage induced in stator winding 244 is proportional to this desired range rate times the cosine of the azimuth angle and is used as a signal to drive the rate servo comprising amplifier 122, motor 231 and generator 232. At the same time, a voltage is induced in stator winding 245 which is proportional to the voltage in rotor winding 243 times the sine of the azimuth angle. This voltage is the input signal to the rate servo comprising servo-amplifier 124, motor 235 and generator 236 and represents the east-west components of the range rate. The rate of change of the east-west components is not precisely equal to the rate of change of longitude and must be modified by a factor proportional to the secant of present latitude. This modification is obtained by means of a resolver 246, the rotor of which is connected to the shaft 36 through appropriate gearing so as to be positioned in accordance with present latitude. The stator winding 245 of resolver 241 is connected through the switch 120 to one input of the servoamplifier 124 while the stator winding 247 of resolver 246 is connected through the switch 119 to another input of the servoamplifier 124. The rotor winding 248 of the resolver 246 is connected through the switch 121 to the generator 236. As a result, the shaft 237 is rotated at a speed proportional to the change of longitude corresponding to the range increment introduced by means of knob 107.

In an analogous manner, the knob 108 may be used to alter the azimuth mark on the cathode ray tube. Displacement of the knob 108 causes a voltage to appear across the rotor winding 242, but since this winding is displaced ninety degrees from winding 243, the voltage induced in stator coil 244 will be proportional to the sine of azimuth and the voltage induced in coil 245 will be proportional to the cosine of azimuth. These voltages drive the two rate servos so that the latitude indication and the longitude indication are altered at an interdependent rate such that the azimuth trace only is affected.

The foregoing description of the manner of adjusting the traces has been rather brief since the details of this portion of the apparatus are not a part of the present invention. For a fuller description of this operation, reference may be made to the aforementioned copending application Serial Number 36,214.

The apparatus so far described is capable of operating properly in either Northern or Southern latitudes and in either Eastern or Western longitudes. To compensate for a change from Northern to Southern latitudes, it is only necessary to reverse one of the phases of the input and output of each of the differential synchros 38 and 39 (FIG. 4a). This may be done by means of four double-pole double-throw switches 249, 250, 251 and 252 which may be mechanically connected for simultaneous operation by a knob 253. When going from East to West longitude, one phase of both the input and output of each of the differential synchros 64 and 65 (FIG. 4c) may be reversed by means of double-pole double-throw switches 254, 255, 256 and 257 operated by a knob 258.

The methods of operation so far described may be briefly summarized by noting that with the slew control knob 122 in its second, or normal, position the counters 24 and 53 will indicate the present latitude and present longitude of the aircraft. Present position is also repeated on the shafts 36 and 59 and is displayed on the counters 37 and 63. With the shafts 40 and 66 set to the latitude and longitude respectively of the prime fix point, the shafts 43 and 68 will be positioned in accordance with the difference in latitude and longitude respectively between present position and the prime fix point. The conductors 92 and 83 will carry voltages indicative of the coordinates of the prime fix point. The second position of the slew control knob 122 is also used to check present position with the aid of known fix points while the third and fourth positions are used to set the shafts 40 and 66 to the latitude and longitude of the prime fix point and to set the coordinates of the other fix points and targets, all as previously described.

So far no mention has been made of the operation of the apparatus with the slew control knob in its first, or reconnaissance, position, nor has the operation of the six-pole switches 34 and 62 been explained. Slew control position one, and the switches 34 and 62, are used for two additional modes of operation designated as "way point fix" and as "reconnaissance" which will be discussed separately.

Way Point Fix

Let it be assumed that the apparatus has been set up as previously described and that aircraft is en route from its home base to the area of operations. Correction of present position at the area of operations has previously been described, but since the flight to the area of operations may cover several thousand miles it may be desirable to check the present position of the aircraft before the area of operations has been reached. This may be done if the aircraft passes near any landmark the position of which is known accurately and which stands out clearly on the radar screen. Such a landmark might be the tip of an island, a railroad bridge, or some similar point. In order to make a way point fix the two switches 34 and 62 are thrown to the position opposite to that indicated in the drawing and the slew control knob 122 is turned to its third, or set up, position. This alters the connections of the various synchros considerably. The differential synchro 25 now has its upper terminals connected to the stator of control transformer 44 while the lower terminals of differential synchro 38 are disconnected. The shaft 36 is no longer positioned in accordance with present latitude but may be adjusted to any desired position by means of the knob 107 which, when displaced, causes a voltage to be induced in winding 105. This voltage is connected through the switch 111 to the servoamplifier 122 the output of which is connected through the switch 113 to the motor 33 which controls the shaft 36. The shaft of the differential synchro 25 is adjusted in accordance with present latitude as usual. Therefore, the upper three terminals of differential synchro 25 now carry information representing the difference in latitude between present position and the position of shaft 36 and this information is led to the control transformer 44 so that the shaft 43 represents this difference in latitude.

Similarly, connections are established in the longitude section of the apparatus so that the position of the shaft 68 represents the difference in longitude between present position and the longitude set into the counter 63. To take a way point fix, the knobs 107 and 108 are displaced until the counters 37 and 63 display the known latitude and longitude of the point. Then conductors 92 and 83 will carry potentials indicative of the $y$ and $x$ coordinates respectively of this known point and traces corresponding to these computed coordinates will appear on the radar set 13. If these traces do not correspond exactly to the traces of the point indicated by the radar set 13 operating independently then the slew control knob 122 is turned to its second position and the present position indicators 24 and 53 are adjusted until the traces do coincide. Present position is then corrected. The knob 122 should now be returned to its second, or normal, position and the switches 34 and 62 returned to the position shown in the drawing whereupon normal operation will be resumed.

Reconnaissance

The purpose of the reconnaissance mode of operation is to make it possible to determine the latitude and longitude of a point of unknown position. Such a determination is particularly useful when passing over portions of the earth for which available maps are inadequate. This mode of operation is initiated by throwing the six-pole switches 34 and 62 to the positions opposite to that shown in the drawing and by turning the slew control knob 122 to its first, or reconnaissance, position. The connections of the synchros are the same as for the way point fix mode of operation and the potentials of conductors 83 and 92 represent the coordinates of the point set into counters 37 and 63 with respect to present position. The corresponding polar coordinates are displayed as azimuth and range traces on the radar set 13.

The counters 37 and 63 are controlled in a different manner in the reconnaissance position than in the way point fix mode of operation so that the azimuth and range traces may be adjusted independently. The voltages induced in windings 105 and 106, when knob 107 and 108 are displaced, are modified by the action of resolver 241 in the same manner as previously described in connection with present position adjustment. However, in the reconnaissance position, motors 33 and 60 are controlled, rather than motors 231 and 235.

To determine the latitude and longitude of an unknown point, the traces are adjusted by means of knobs 107 and 108 until they coincide with the representation of the point obtained by the radar set 13 acting independently. At this time, the counters 37 and 63 will display the latitude and longitude of the unknown point and record my be made of this position. After the position has been recorded the counters 37 and 63 should be returned to correspondence with the present position indicators 24 and 53 and then the switches 34 and 62 should be returned to the positions shown in the drawing and the slew control knob 122 returned to its normal position.

Guidance Computer

FIG. 6 illustrates the geometry of the problems solved by the guidance computer. The point T represents the first target of a group of targets and corresponds to $T_1$, $T_2$ or $T_3$ of FIGS. 1 and 3. The first missile is to be dropped upon the point T and subsequent missiles are to be dropped along the target line. In general there will be a wind and therefore the ground track aiming point (GTAP) will be upwind from the target by a distance $V_w t_1$ where $t_1$ is a ballistic quantity having the dimension of time and which is a function of airspeed and altitude. The drop line along which the aircraft must be flown will, of course, pass through the ground track aiming point and will be parallel to the target line. The release point, at which the first missile is dropped, will be on the drop line a distance $v_g t_2$ from the ground track aiming point where $t_2$ is another ballistic quantity having the dimension of time. The exact nature of the quantities $t_1$ and $t_2$ will be fully explained when the Ballistics Computer is considered.

The release point is the first point over which the aircraft must pass, but it would obviously be unsuitable to guide the aircraft directly from its present position, A, to this point. It must be guided so as to pass over this point while on the proper course. An imaginary circle is drawn tangent to the drop line and also tangent to a line perpendicular to the drop line through the release point. In one specific embodiment this circle was selected to have a radius of five miles and this radius will be assumed in the following description. The aircraft will be guided from its present position along a course tangent to this circle, then along the arc of the circle to its point of tangency with the drop line and then along the drop line. The following symbols will be used in the detailed description:

B—Point on tangent five miles beyond point of tangency
$x'$, $y'$—Coordinates of point T relative to aircraft
$x_{GTAP}$, $y_{GTAP}$—Coordinates of ground track aiming point
$a$, $b$—Distances from present position to GTAP perpendicular and parallel to the drop line
$a'$, $b'$—Distances from present position to point B perpendicular and parallel to the drop line
$C_T$—Azimuth of target line
$C_A$—Azimuth of line AB
T—Azimuth of aircraft ground track
$V_w$—Wind velocity
W—Azimuth of wind Referring now to FIG. 7a, three synchro transmitters 291, 292 and 293 are provided for manually inserting the azimuths of the three target lines. Each synchro transmitter has its primary connected to a source of alternating current and each is provided with a knob for manually positioning its rotor. The three wire output from one of the synchro transmitters is selected by means of two ganged five position switches 294, and 295. The output from the selected synchro transmitter is used to position a shaft 301 by means of a control transformer 302 the error signal from which drives a position servo comprising servoamplifier 303, a motor 304, a generator 305 and a gear box 306.

A voltage proportional to $x'_T$ is received from the coordinate computer 12 and has subtracted from it, by means of a transformer 307, a voltage proportional to $V_w t_1 \sin W$ which is received from the ballistics computer 15. Similarly, a voltage proportional to $y'_T$ is received from the coordinate computer 12 and has subtracted from it, by means of a transformer 308, a voltage proportional to $V_w t_1 \cos W$ which is received from the ballistics computer 15. The apparatus for deriving the voltages $V_w t_1 \sin W$ and $V_w t_1 \cos W$ is set forth hereinafter in connection with the detailed description of the balistics computer. For the present, it will suffice to assume that such voltages are available. The resulting voltages are proportional to $x_{GTAP}$ and $y_{GTAP}$ and are connected through amplifiers 309 and 311 respectively, to the rotor windings 312 and 313 of a resolver 314 the rotor of which is mechanically connected to the shaft 301 so as to be positioned in accordance with the angle $C_T$. The voltages induced in the stator windings 315 and 316 are therefore proportional to $a$ and $b$ respectively.

It is next required to compute $a'$ and $b'$. It can be shown from the geometry of FIG. 6 that, when $a$ is positive, $$a' = a - 5 + 5 \cos (C_A - C_T) + 5 \sin (C_A - C_T)$$
$$b' = b - V_g t_2 - 5 - 5 \sin (C_A - C_T) + 5 \cos (C_A - C_T)$$

This computation is made by means of a second servo. Two resolvers 317 and 318 have their rotors connected to a common shaft 319. Let it be assumed for the moment that shaft 319 is positioned in accordance with the angle $C_A - C_T$. The voltage from stator winding 315 which is proportional to $a$ has subtracted from it a constant voltage of a magnitude representing five miles. This voltage is obtained from the secondary winding 321 of a transformer 322 the primary of which is excited from the secondary winding 327 of another transformer 323 the primary of which is connected to a source of alternating current. The resulting voltage, $a$ minus five miles, is connected through the stator winding 324 of resolver 318 and thence to the rotor winding 325 of the resolver 317. One rotor winding of the resolver 318 is excited by the voltage from a secondary winding 326 of the transformer 322 while the other rotor winding of the resolver 318 is excited from secondary winding 327 of transformer 323. By reason of this excitation of the rotor winding of resolver 318, the stator winding 324 has induced therein a voltage proportional to $$5 \cos (C_A - C_T) + 5 \sin (C_A - C_T)$$

Therefore, the voltage applied to the rotor winding 325 of resolver 317 is proportional to $a'$.

The voltage from stator winding 316 of the resolver 312, which is proportional to $b$, has subtracted from it a voltage proportional to $V_g t_2$, which is obtained from the secondary winding 328 of a transformer 329, the primary of which is excited by a voltage proportional to $V_g t_2$, obtained from the ballistic computer 15. This resulting voltage has subtracted from it a constant voltage representing five miles obtained from the secondary winding 331 of the transformer 323 and this voltage is in turn connected through the stator winding 333 of the resolver 318 to the rotor winding 334 of the resolver 317. The stator winding 333 has induced in it a voltage proportional to $$5 \cos (C_A - C_T) - 5 \sin (C_A - C_T)$$

Therefore the resulting voltage applied to the rotor winding 334 is proportional to $b'$.

The shaft 319 is positioned in accordance with angle $C_A - C_T$ by means of a servoamplifier 336, a motor 337, a generator 338 and a suitable gear box 339. The error signal for driving the servoamplifier 336 is taken from the stator winding 341 of the resolver 317. The connection from winding 341 to the generator 338 and servoamplifier 336 can be traced through conductor 342, the lower end of a potentiometer 343, (FIG. 7b), the slider 344 of this potentiometer, the switch 345, the switch 346, the switch 347, and conductor 348. The purpose of potentiometer 343 will be explained when the distance-to-go servo is considered and for the moment it may be disregarded. Also for the moment, all of the switches will be assumed to be in the positions shown in the drawing and their function will be explained when the connections of the relay windings operating them are considered. It can be seen that if potentials proportional to $a'$ and $b'$ are impressed upon rotor windings 325 and 334 of resolver 317, the voltage in winding 341 can be zero only if the shaft 319 is positioned in accordance with the angle $C_A - C_T$.

Referring now to FIG. 7b, three-wire information representing the azimuth of the actual ground track of the aircraft, T, is received from the navigation system 11 and impressed upon one set of windings of the differential synchro 351, the rotor of which is connected to the shaft 301 in order to be positioned in accordance with the angle $C_T$. The three-wire output of differential synchro 351, representing the angle $T-C_T$, is connected to the stator winding of a control transformer 352, the rotor of which is connected to the shaft 319. The voltage induced in the rotor winding 353 of the control transformer 352 will be zero only if the ground track angle T is equal to the azimuth, $C_A$, of the line AB. The voltage of this winding 353, after passing through amplifier 354, may be used as an error signal for the autopilot or may operate a pilot's direction indicator if the aircraft is being flown manually. It is therefore seen that the mode of operation just described provides guidance from present position along the tangent line AB.

Distance-To-Go Servo

Referring to FIG. 6, the distance from present position to the release point is seen to be equal to the distance from A to the point of tangency, plus the arc of the circle, plus five miles; or, since the point B is five miles beyond the point of tangency, the distance-to-go is AB plus the arc of the circle included in the angle $(C_A-C_T)$.

Referring back to FIGS. 7a and 7b, the distance AB is obtained as the voltage of the stator winding 355 of the resolver 317. A voltage representing the length of the arc of the circle is obtained from a potentiometer 356 operated by the shaft 319 and having a constant voltage obtained from secondary winding 357 of transformer 323 impressed across its extremities. This voltage is added to that of the winding 355 and after passing through switches 358 and 359 is balanced by the voltage from a potentiometer 361. The potential of the slider 362 is used as the input to a position servo comprising a motor 363, a generator 364, and a servoamplifier 365. The motor and generator are connected through one or the other of gear boxes 366 and 367 and a gear box 368 so as to position the slider 362 and the shaft 369 in accordance with the distance-to-go.

The shaft 369 is connected through a gear box 371 to position the slider 344 of potentiometer 343 and also, through gear box 372, turns a cam 373. The cam 373 is arranged to operate a switch 374 when the distance-to-go is less than fifty miles. Closure of the switch 374 energizes a relay $K_4$ which operates all of the switches marked $K_4$ to the positions shown in the drawing and also operates four switches in the coordinate computer 12, two of which, switches 201 and 209, are shown in FIG. 4d and the other two of which are in the coordinate rotator 215 of FIG. 4d. Operation of these switches changes the scale factor of the voltages used. For example, when the distance-to-go is greater than 50 miles the scale factor may be 0.03 volt per mile while when the distance-to-go is less than 50 miles the scale factor may be 0.3 volt per mile.

As can be seen from the drawing the potentiometer 361 has different voltage gradients on different portions so as to have three different scale factors of shaft rotation representing miles of distance. For example, from 500 to 50 miles each turn of the potentiometer may represent 150 miles; from 50 to 5 miles each turn may represent 15 miles and form +5 to —35 miles each turn may represent 10 miles. The various voltages for energizing the potentiometer 361 are obtained from the secondary winding 375 of a transformer 376, the primary of which is connected to a source of alternating current. The scale factor change at the 50 mile point is made by means of a switch 377 operated by the relay $K_4$. A meter 378 is connected to the shaft 369 through a gear box 379 and displays the distance remaining from present position to the release point.

Returning for a moment to the $(C_A-C_T)$ servo, which positions shaft 319, it will be recalled that the error signal from winding 341 of resolver 317 was passed through the potentiometer 343. This is because the sensitivity of this error signal is proportional to the distance AB. In order that the servo sensitivity may be reasonably constant for all distances, the error signal is attenuated by the potentiometer 343 which has a roughly hyperbolic taper. Actually, two potentiometers are required, one, potentiometer 343, to cover the distance from 5 to 50 miles, and another, potentiometer 381, for distances between 50 and 500 miles. As shown schematically in the drawing, one or the other slider always makes contact, and both make contact in the region just below 50 miles. The electrical connections are switched from one to the other by means of the switch 345 operated by the relay winding $K_4$. A switch 382 also operated by relay winding $K_4$, changes the voltage impressed on the primary winding or transformer 323 thereby changing the voltages of secondary windings 327, 331 and 357.

Approach From Opposite Side of Drop Line

FIG. 6 illustrates the situation when the aircraft approaches the drop line from the left. If the approach is made from the right, that is, if $a$ is negative, a different circle, one on the righthand side of the drop line, must be used. This condition requires that certain voltages in the computer be reversed in phase.

It will be recalled that when $a$ is positive the equations for $a'$ and $b'$ are as follows:

$$a'=a-5+5\cos(C_A-C_T)+5\sin(C_A-C_T)$$
$$b'=b-V_g t_2-5-5\sin(C_A-C_T)+5\cos(C_A-C_T)$$

When $a$ is negative the equations become $$a'=a+5-5\cos(C_A-C_T)+5\sin(C_A-C_T)$$
$$b'=b-V_g t_2-5+5\sin(C_A-C_T)+5\cos(C_A-C_T)$$

It can be seen from the above equations that the constant voltage representing 5 miles which is subtracted from $a$ must be reversed as must the excitation of the primary windings of resolver 318 which produce voltages proportional to $5\cos(C_A-C_T)$ in stator winding 324 and $5\sin(C_A-C_T)$ in stator winding 333. This phase reversal is accomplished by means of the switch 384 which reverses the phase of the primary winding of transformer 322.

A different potentiometer must also be used to derive the length of the arc traveled around the circle and the switch 358 removes potentiometer 356 from the circuit and substitutes therefor the potentiometer 385. The switches 384 and 358 are operated by means of a relay winding $K_1$. A voltage proportional to $a$, obtained from the stator winding 315 of the resolver 312, is led via a conductor 386 to a phase sensitive amplifier 387 one output of which operates a sensitive relay 388 when $a$ is negative. The relay 388 in turn energizes relay winding $K_1$ which operates the switches 384 and 358.

Travel Around Circle

Thus far, we have described the guidance of the aircraft along the tangent line toward the circle. A different mode of operation is necessary to cause the aircraft to travel around the circle instead of continuing on to point B. This mode of operation is initiated when the distance AB approaches 5 miles. The voltage proportional to AB from the stator winding 355 of the resolver 317 has a voltage proportional to 5 miles subtracted from it by connecting it in series with a resistor 391. The resulting voltage is applied as one input to the amplifier 392 which closes a sensitive relay 393 when $AB$ minus 5 miles is less than about 0.2 mile. The sensitive relay 393 in turn energizes relay winding $K_2$ which operates switches 346 and 394 to the positions opposite to those shown in the drawing. Operation of the switch 346 substitutes this same voltage proportional to $AB$ minus 5 miles for the voltage from stator winding 341 of resolver 317 as the input to the servoamplifier 336. This voltage proportional to $AB$ minus 5 miles reaches the switch 346 via a switch 395 and a transformer 396. The switch 395, operated by the relay winding $K_1$, reverses the phase of the error signal when $a$ is negative.

The error signal $AB$ minus 5 miles operates the servo so as to adjust the angle $(C_A - C_T)$ to maintain the distance from present position to the point B exactly equal to 5 miles. As can be seen from FIG. 6, if the aircraft continued to fly along the line AB past the point of tangency, the servo would reduce the angle $(C_A - C_T)$ thereby causing the point B to move counterclockwise around the circle. The reduction in the angle $(C_A - C_T)$ in turn affects the guidance signal obtained from the winding 353 of the control transformer 352 in such a way as to cause the aircraft to turn with the circle. In this mode of operation, the course $C_A$ will always be perpendicular to the radius of the circle at the present position. When the aircraft is actually on the circle, this is indeed the desired course. However, if the aircraft is not precisely on the circle, a different course is required.

Referring now to FIG. 8, suppose that the aircraft instead of being on the circle is at some point A'. It is obvious that the course $C_A$, perpendicular to the radius, is unsuitable. $a''$, the distance from the circle to present position, and $b''$, the distance from the point of tangency to B, are the outputs of stator windings 341 and 355 respectively of resolver 317. In order to set up a guidance direction which will bring the aircraft back to the circle a voltage proportional to $a''$ is added through switch 394 to the signal from winding 353 of control transformer 352 and the resulting voltage becomes the signal to the pilot's direction indicator. This results in a guidance path tending to bring the aircraft back to the circle in case it should deviate therefrom for any reason. Of course, if the aircraft is precisely on the circle, $a''$ will be zero.

In order to avoid initiating this mode of operation when the aircraft is too far off course, a voltage proportional to $a''$ is applied as a second input to the amplifier 392 so that the relay $K_2$ will not be energized unless the distance AB minus 5 miles is less than 0.2 mile and, at the same time, the absolute value of $a''$ is less than 2 miles.

*Travel Along Drop Line*

After the aircraft has completed its travel along the arc of the circle a third mode of operation is required to cause it to travel along the drop line. It will be recalled that the input to the amplifier 387 is a voltage proportional to $a$. This amplifier has a second output which energizes a sensitive relay 397 when the absolute value of $a$ becomes less than one mile provided that the angle $(C_A - C_T)$ is, at the same time, less than 12 degrees. A switch 398 operated by a cam 399 turned by the shaft 319 is connected in series with the operating winding of relay 397. If both conditions are met, that is, if $a$ is less than one mile and $(C_A - C_T)$ is less than 12 degrees, the relay 397 is energized and closes the circuit to a multiple contact relay $K_3$. A switch 401 is in series with the winding $K_3$ and is operated by the relay $K_4$ which, it will be recalled, is closed when the distance-to-go is less than 50 miles. A switch 402 operated by the winding $K_3$ is connected in parallel with the switch 398 so that once the relay 397 is energized, it can remain energized even if the angle $(C_A - C_T)$ should subsequently become greater than 12 degrees.

During this mode of operations the steering error signal is equal to $a - \sin(T - C_T)$. A switch 403 operated by winding $K_3$ connects this signal to the amplifier 354. The signal proportional to $\sin(T - C_T)$ is taken from one phase of the output of differential synchro 351 while the voltage proportional to $a$ is obtained directly from conductor 386. These voltages are combined by means of resistors 404 and 405. The winding $K_3$ also operates switch 406 (FIG. 7a) which disconnects the voltages proportional to $a$ and to $b - V_g t_2$ from the $(C_A - C_T)$ servo system.

During this mode of operation, the distance-to-go is simply $b - V_g t_2$ and a voltage proportional thereto is led by a conductor 407 and the switch 359 to the input of the distance-to-go servo.

*Drop—Don't Drop Signal*

It will be recalled that the guidance computer generates a series of voltage pulses, illustrated as 60 per mile, which are transmitted to the intervalometer, and also generates a single pulse when the distance-to-go is zero and passes this signal to the intervalometer as either a "drop" or "don't drop" pulse. Two commutators 408 and 409 are fastened to a shaft 410 which is connected through suitable gearing 411 to the distance-to-go shaft 369 so as to turn at the rate of one revolution per mile. Both commutators have all of their conductive segments connected to one terminal of a source of voltage, the other terminal of which is grounded. The commutator 408 is provided with sixty segments and a single brush 412 which is connected through a conductor 413 to the intervalometer. The commutator 409 has but a single conductive segment and its brush 414 has a potential impressed on it once each revolution, or once each mile in the range from $+5$ to $-35$ miles. It will be understood that the showing in the drawing is schematic only, and that the sixty segments of commutator 408 are evenly spaced so that a pulse is transmitted over conductor 413 each $\frac{1}{60}$ of a mile. It will also be understood that the two commutators can be combined in a single disk or drum.

A voltage pulse appears on brush 414 once each revolution of shaft 410, but only that pulse corresponding to zero distance-to-go is to be transmitted to the intervalometer. The brush 414 is connected in series with a normally open switch 415 operated by a cam 416 mounted on the shaft 369. The cam 416 closes the switch 415 only when the distance-to-go is approximately zero so that only the zero distance pulse can be transmitted.

After leaving the switch 415, the voltage pulse passes through another cam operated switch 417, which will be regarded as closed for the time being, and thence to the armature of a two-pole switch 418 operated by a relay winding 419. The switch 418 selects either conductor 421 or conductor 422, depending upon whether the aircraft is near enough to its proper position and on the proper course so that a missile, if dropped, will not miss its target by more than a predetermined amount. If conductor 421 is selected, the pulse becomes a "drop" pulse, and the intervalometer will actuate the missile dropping equipment. If conductor 422 is selected, the pulse becomes a "don't drop" pulse and the intervalometer will immediately initiate guidance to the next group of targets.

*Computation of Excessive Miss of Target*

Referring now to FIG. 9, the aircraft should be at the release point P when the distance-to-go is zero. However, the pilot may have been required to take evasive action just before reaching this point so that the aircraft may actually be at some other point such as P'. Also, it is possible that the actual course of the aircraft is not parallel to the drop line, but that it makes some angle $(T - C_T)$ therewith. It is desired that no missile be dropped if it would miss its target by more than a predetermined amount, for example, 600 feet. It can be seen from FIG. 9 that if the aircraft is at point P' it would be possible for a missile to hit its target provided that the course of the aircraft were proper. It can also be seen that the target could be hit even with considerable course error provided that the perpendicular distance from the release point were selected properly. It will be recalled from the previous discussion of FIG. 6 that the distance along the drop line from the release point to the ground track aiming point is equal to $V_g t_2$, and that the perpendicular distance from present position to the drop line is equal to $a$. It is apparent from the geometry of FIG. 9 that the distance HP is equal to $V_g t_2 \tan(T - C_T)$. Since we are dealing with small angles the approximation $V_g t_2(T-C_T)$ will be sufficiently accurate. Therefore, if the absolute value of $$a - V_g t_2(T - C_T)$$

is less than 600 feet, the miss will not be excessive.

The computation of excessive miss as above described is not the sole criterion as to whether missiles should be dropped. If the course of the aircraft deviates too far from the azimuth of the drop line, it is possible that although, the first target of the group be hit with sufficient accuracy succeeding targets of the same group may be missed excessively. It is therefore necessary to determine; (1) whether the first target will be missed excessively and (2) whether the course of the aircraft is sufficiently close to the azimuth of the drop line. During this mode of operation, when the aircraft is traveling along the drop line, the servo which formerly computed the angle $(C_A - C_T)$ is no longer needed for this purpose and can be used to solve for the angle $(T - C_T)$. This is done by means of the switch 347 (FIG. 7b) which connects the winding 353 of the control transformer 352 through conductor 348 and the generator 338 to the input of servoamplifier 336. The shaft 319 is therefore positioned in accordance with the angle $(T - C_T)$.

A potentiometer 424 (FIG. 7a) has its slider connected to the shaft 319 and is excited by a voltage proportional to $V_g t_2$ obtained from the secondary winding 425 of the transformer 329. The potential between the slider and the center tap of potentiometer 424 is therefore proportional to $V_g t_2(T - C_T)$. This potential is subtracted from a potential proportional to $a$ obtained from the winding 315 of the resolver 312 and the resulting voltage is led via conductor 426 to the input of an amplifier 427. The output of the amplifier 427 energizes the relay winding 419 only when the input voltage is less than an amount proportional to 600 feet. The winding 419 operates the switch 418 so that the drop conductor 421 can be selected only if the computed miss of the first target is less than 600 feet.

A cam 428 rotated by the shaft 319 is arranged to operate a switch 429 only when the angle $(T - C_T)$ is between +6 and −6 degrees. This switch 429 is in series with the relay winding 419 so that the conductor 421 is selected only if the computed miss is less than 600 feet and if the angle $(T - C_T)$ is less than 6 degrees.

Let us assume that all of the missiles in the first group have been released and that the intervalometer has generated a signal indicative thereof and that guidance to the next group of targets has been initiated. Guidance to the next group involves operation of the switches 163 and 164 (FIG. 4d) in the coordinate computer 12 and switches 294 and 295 in the guidance computer (FIG. 7a). Therefore, all of the inputs to the guidance computer will have been changed and all of the servos will start to operate in accordance with the new conditions. In particular, the distance-to-go servo will now start operating in the reverse direction so as to change the distance-to-go from a negative quantity to some positive quantity. It will be recalled that a voltage pulse appears on brush 414 once each mile and that this pulse is passed through switch 415 whenever the distance to go is zero. This pulse will also appear and be passed by switch 415 when the distance-to-go servo is running backwards and passes through zero. In order to prevent such a pulse from initiating the missile dropping operation, the switch 417 is provided. This switch is operated by a lever 429 which is connected through a slip clutch 431 to the shaft 369. By this arrangement, the switch 417 is closed only when the shaft 369 is turning in the direction of decreasing distance-to-go. Therefore, the pulse from brush 414 which also is generated while the distance-to-go servo is returning through zero, cannot initiate the missile dropping operation.

During normal forward operation of the distance-to-go servo, a fairly large gear ratio is necessary between the motor 363 and the shaft 369 and is provided by the gear box 367. If this gear ratio were not decreased during the restoration interval, an excessive amount of time might be required for recovery after one of the runs is finished. A clutch mechanism 433 is operated by a solenoid 434 to substitute a lower ratio gear box 366 during the restoration interval. The solenoid 434 is connected to a source of alternating current through a switch 435 which is also actuated by the lever 429, but only if the shaft 369 is turning in the direction of increasing distance-to-go.

*Intervalometer*

A schematic diagram of the intervalometer is shown in FIG. 10. The patch board 451 is provided so that the number of missiles in each group and the spacing between the individual missiles can be set into the apparatus in advance. The inner section of the patch board 451 contains sixty jacks corresponding to incremental distances of 1/60 of a nautical mile. The markings on the patch board indicate distances in hundreds of feet and this is approximately correct since a nautical mile contains approximately six thousand feet. The outer section of the patch board 451 contains thirty-nine double jacks, one for each missile to be released. The specific embodiment being described provides for a maximum of forty missiles to be released in three separate runs. The spacing between individual missiles may be as little as one hundred feet or as much as one mile.

The first missile is released when the distance-to-go is zero and no jack is provided for the first missile. If the second missile is to be released half a mile from the first, a patch cord would be plugged into the jack marked .5 mile and into the jack marked drop No. 2. If the third missile were to be released 8/10 of a mile from the second or a distance of 1.3 miles from the first, a patch cord would connect drop No. 3 to the .3 mile jack. If the fourth missile were to be released at 1.8 miles from the first, a cord would connect drop No. 4 to the .8 mile jack. The fifth missile could be released at 2.8 miles from the first by merely patching drop No. 5 into the second section of drop No. 4. In a similar fashion the spacing of the remaining missiles in the first run could be set up. If fourteen missiles were to be dropped in the first run and the second run started with No. 15, a cord would be plugged into drop No. 15 and into the terminal on the bottom of the board marked "start run 2." Similarly, the missile which is to start run 3 would be plugged into the "start run 3" jack. If the third run were to be concluded with the fortieth missile, no patching would be necessary to the "run 3 finished" jack, but if, for example, only thirty-five missiles were to be dropped altogether then drop No. 36 would be patched into the "run 3 finished" jack.

A commutator 452 is provided with a single movable arm 453 and sixty contacts evenly spaced about its periphery. Sixty conductors connect the segments respectively to the distance jacks in the center of the patch board. The arm 453 is rotated by means of a ratchet solenoid comprising a winding 454 and a clutch 455. When the winding 454 is energized, the clutch 455 is engaged and rotates the shaft 456 through 1/60 of a revolution. When the winding 454 is de-energized, the clutch 455 is released.

A second commutator 458 is provided with a single rotating arm 459 and forty contacts equally spaced about its periphery. The first contact is connected to conductor 461 which is also connected to the "run 3 finished" jack. The remaining contacts are connected respectively to the individual missile jacks around the outer section of the patch board 451. The arm 459 is rotated through the shaft 462 and a ratchet solenoid comprising a winding 463 and a clutch 464 similar to that previously described. The various relays are shown in their normal or de-energized positions. Two sources of voltages are shown, one source being a direct current source having its negative terminal grounded and its positive terminal applied at various places as shown by the terminals marked with a plus sign. The other source of voltage is a direct current source obtained from the full wave rectifier comprising diodes 466 and 467 energized from the secondary of a transformer 468 the primary of which is connected to an alternating current source.

The remainder of the apparatus can best be described by considering its operation. Application of the voltage sources places a positive potential on terminal 471 which is transmitted through the normally closed contacts 472 of a relay 473 to one terminal of a normally closed switch 474. The switch 474 is opened once each revolution of the shaft 456 by means of a cam 475 mounted on the shaft 456. The other terminal of switch 474 is connected through a switch 476 to the winding 454. The switch 476 is also operated by the shaft 456 and remains closed except for a brief period after the clutch 455 has been engaged and has turned the shaft 456 $\frac{1}{60}$ of a revolution. At this point, the switch 476 opens but when the winding 454 is thereby de-energized, the switch 476 again closes. It can be seen that the winding 454 will be initially energized so as to rotate the shaft 456 and will then be de-energized by the operation of switch 476 and then re-energized. The result is that the arm 453 will be stepped around until the cam 475 opens the switch 474. At this time the arm 453 will make contact with the commutator segment which is connected to the zero distance jack on the patch board 451, which position is illustrated in the drawing as being vertical.

A potential on the terminal 478 will be transmitted through the contacts 479 of the relay 473, the contacts 481 of a relay 482, conductor 521, contacts 483 of a relay 484 and conductor 489 to a relay winding 485. The winding 485 is energized and its contacts 486 are closed thereby putting a positive potential on the conductor 487. This potential energizes the winding 463 so as to advance the arm 459 through $\frac{1}{40}$ of a revolution. The potential on conductor 487 also energizes the relay winding 484 which, after a short time delay of, for example 0.1 second, opens the contacts 483 thereby de-energizing the winding 485. The de-energization of winding 485 opens the contacts 486 so that windings 484 and 463 are de-energized. Thus, the stepping of arm 459 will continue. When the arm 459 has reached the contact corresponding to the first missile, which position would be vertical in the drawing, the positive potential from the full wave rectifier on the conductor 489 is transmitted through the arm 459 to the conductor 461. At this point the arm 459 comes to rest as will be explained below.

Three five-position switches are arranged for simultaneous operation by a shaft 494, which may be rotated step by step by a ratchet solenoid comprising a winding 495 and a clutch 496. The switches are placed in their first, or most counterclockwise, position for navigation of the aircraft from its base to the area of operations. The second, third and fourth positions correspond to missile dropping runs numbers 1, 2 and 3 respectively. The fifth position is used when the last run has been completed and the aircraft is to be guided back to its base. The switches are shown in the drawing in the run No. 1 position and when in this position the potential appearing on conductor 461 as above described passes through the switch 491 and energizes the relay winding 482 thereby opening the contacts 481 which de-energizes conductor 521 and stops the operation of relays 485, 484 and 463.

In summary then it can be seen that the application of power to the apparatus causes the arm 453 to be stepped around until it makes contact with the segment connected to the jack corresponding to zero miles; the arm 459 is stepped around until it makes contact with the segment corresponding to the first missile; and all of the relays are de-energized with the exception of relay 482 which is energized so as to open the contacts 481. The apparatus is now in condition to start the missile dropping operation upon the receipt of a drop pulse from the guidance computer 14.

Before continuing with the explanation of the remainder of the intervalometer, the effect of switch 493 on the other apparatus should be discussed. When the aircraft is being flown from its base toward the area of operations, the navigation system 11 (FIG. 2) only is operative. At this time "long range" guidance is in effect. The pilot's direction indicator, or the autopilot, as the case may be, is operated directly by the navigation system 11, rather than by the guidance computer 14. At this time the switches 491, 492 and 493 are in their first position, and no potential passes through switch 493 to the conductor 523. When the area of operations is reached the switches are moved to their second position (the position shown in FIG. 10) to start guidance to the first target. A potential is now applied to conductor 523 which may be used to operate a suitable relay to switch the P.D.I. or autopilot from the navigation system 11 to the guidance computer 14. This "short range" guidance will continue as the switches are moved to their third and fourth positions, corresponding to run No. 2 and run No. 3, but long range guidance will be resumed after run No. 3 is completed.

Returning now to the intervalometer, when the distance-to-go to the ground track aiming point becomes zero either a drop or don't drop pulse is transmitted to the intervalometer from the guidance computer 14. Let us consider first the operation when a drop pulse is received. This drop pulse appears on terminal 501 and energizes the relay winding 502. Closure of contacts 503 places a positive potential on conductor 489 which operates relays 485, 484 and 463 in the manner previously explained so as to rotate the arm 459 one step so that it now makes contact with the commutator segment connected to a drop No. 2 jack. This removes the positive potential from conductor 461 thereby deenergizing relay 482 but this has no effect, for reasons explained below. The positive potential on conductor 489 cannot flow through diodes 466 and 467 and therefore has no effect on the relay winding 482.

The energization of winding 502 also closes contacts 504 which places a positive potential on the arm 453. Closure of contacts 504 also energizes relay winding 473 which in turn operates contact 479 to its other position thereby sealing in relay 473 through the normally closed contacts 505 of a relay winding 506 so that winding 473 can remain energized after passage of the drop pulse and the consequent de-energization of winding 502. The switching of contacts 479 also removes the positive potential previously applied to the conductor 521 so that no potential can appear thereon in spite of the fact that relay 482 has been de-energized thereby closing contacts 481.

The energization of winding 473 also closes contacts 507 thereby short circuiting conductor 487 to the conductor 508. The conductor 508 is connected to the winding 509 which, when energized, closes contact 511. Closure of these contacts may be utilized by the missile dropping equipment to release one missile. The energization of relay 485 from contacts 503 has already closed contacts 486 and has thereby put a potential on conductor 487 momentarily in order to operate the ratchet solenoid 463. This potential is therefore also transferred via contacts 507 to the conductor 508 so that the first missile is released.

Energization of winding 473 also opens contact 472 so that winding 454 cannot be energized from the circuit even when the cam 475 allows the switch 474 to close. Winding 473 also operates contact 512 thereby connecting the sixty pulses per mile output of the guidance computer 14 to the relay winding 513.

In summary then, the receipt of a drop pulse releases the first missile, steps the arm 459 from its No. 1 to its No. 2 position, and starts the arm 453 rotating in steps. This latter operation occurs as the relay winding 513 is successively energized by the sixty pulses per mile from the guidance computer 14. The winding 513 closes contact 514 which in turn energizes the winding 454. Each pulse therefore advances the arm 453 by one step.

As the arm 453 advances step by step, it places a positive potential successively on the various jacks in the inner portion of the patch board 451. Nothing happens however until the jack which is patched to drop No. 2 is energized. In the previous example, drop No. 2 was patched to the .5 mile position. Using this example, when the arm 453 is advanced to this position, a potential appears on the .5 mile jack, is transferred by the patch cord to the drop No. 2 jack and thence to the second segment of commutator 458 and via arm 459 to the conductor 489. The consequent energization of winding 485 places a potential on conductor 487 thereby advancing arm 459 by one step and simultaneously energizing the missile dropping relay 509. Continuing our previous example wherein the No. 3 missile was to be dropped at 1.3 miles from the first, nothing further will happen until the arm 453 has completed its first revolution and advanced to the .3 mile position. It should be noted that nothing happened the first time the arm 453 passed this point because, at that time, the arm 459 was at its drop No. 2 position. Now, however, the arm 459 is at its No. 3 position thereby putting a potential on conductor 489 which steps the arm 459 to its No. 4 position and releases another missile. The fourth missile is released when the arm 453 has advanced to the .8 mile position and the fifth misisle will be released one revolution later when the arm 453 again reaches its .8 mile position. Succeeding missiles of the first run are released in accordance with the distances established by the patch board.

Let us assume that fourteen missiles were selected for the first run and that the second run is to start with missile No. 15. In this case, one of the drop No. 15 jacks will be connected to the "start run 2" jack. When the fourteenth missile is release the arm 459 will be stepped around to its fifteenth position. At this time the potential from the full wave rectifier appearing on conductor 489 will be connected through arm 459, segment No. 15, the cable to the drop No. 15 jack and the patch cord to the "start run 2" jack. This potential then passes through conductor 515 and the switch 492 and energizes relay winding 516. Winding 516 closes contacts 517 thereby allowing a positive potential from terminal 478 to pass through the contacts 479 and 517 to the ratchet solenoid 495 which advances the shaft 494 one position. This advance in position now places the potential of conductor 515 on the switch 491 so that the relay 482 is energized and the switch 481 opens.

The winding 516 also closes contacts 518 thereby energizing relay winding 506 and opening contacts 505. The opening of contacts 505 de-energizes the winding 473 so that the switches 479, 507, 472 and 512 revert to their normal positions as shown in the drawing. The rotation of the shaft 494 also has now advanced switch 492 so that the potential from conductor 515 is no longer applied to the relay 516 and this relay also drops out. At this point all of the relays are de-energized except relay 482 and the arm 459 is at its fifteenth position. Upon receipt of the next drop pulse, the missiles of run No. 2 will be released in a manner similar to that above described in connection with run No. 1. Run No. 2 is terminated when the "start run 3" is jack is energized through a patch cord connected to the desired "drop No." jack. The third run is completed either when the "run 3 finished" jack is energized from a patch cord connected to one of the "drop No." jacks, or after all forty missiles have been released. In either event, conductor 461 will be energized, which through the switch 492, relay 516, and contacts 517, energizes the solenoid 495 so as to step the switches 491, 492 and 493 to their fifth position, thereby removing the potential from conductor 523 and relinquishing guidance control to the navigation system 11.

So far nothing has been said of the operation when a don't drop pulse is received. Let us assume that the apparatus has been set up and that we are awaiting either a drop or don't drop pulse to start run No. 1. In this condition, the arm 453 and the arm 459 will both be at their starting positions, vertical as shown in the drawing. Relay 482 will be energized but all of the other relays will be de-energized. The switches 491, 492 and 493 will be in the positions shown in the drawing. If now a don't drop pulse is received via terminal 519, the winding 495 will be energized immediately and switches 491, 492 and 493 will be advanced by one step. The advancing of switch 491 will remove the potential of conductor 461 from the winding 482 thereby allowing contact 481 to close. This will place a potential from terminal 478 on the conductor 521 which, as already explained, will energize winding 463 and start the arm 459 in its stepping rotation. When the arm 459 has advanced to its fifteenth position, the potential on conductor 489 from the full wave rectifier will appear on conductor 515 and will pass through switch 491 thereby energizing relay 482 and stopping the rotation of arm 459. Note that during this operation no potential appeared on conductor 508 and therefore no missiles were dropped. The arm 453 has remained in its zero position and the apparatus is in condition to receive either a drop or a don't drop pulse for run No. 2.

*Ballistics Computer*

In the explanation up to this point it has been stated that the ground track aiming point is upwind from the target a distance equal to $V_w t_1$ and that the release point lies along the drop line a distance equal to $V_g t_2$ from the ground track aiming point, but the quantities $t_1$ and $t_2$ have not been fully explained. The nature of the quantities $t_1$ and $t_2$ and the manner in which they are computed requires some consideration of the ballistics of a freely falling object.

The bombing geometry is shown in FIG. 11. If an aircraft releases an object at point P and continues to fly in a straight line until the object hits the earth, it (the aircraft) will have proceeded through the air mass to point A a distance equal to airspeed times time of fall ($V_a t_f$). At this instant the object will be behind the aircraft in the air mass a distance AB referred to as trail ($T_r$). During the fall the air mass, including both the aircraft and the dropped object, will have moved a distance in the wind direction equal to wind magnitude times time of fall ($V_w t_f$). Relative to the ground the aircraft will have proceeded along its ground track to point C, a distance equal to ground speed times time of fall ($V_g t_f$). Thus two similar triangles are formed, the larger having its three sides equal to $V_a t_f$, $V_w t_f$, and $V_g t_f$. One side of the smaller triangle is equal to $T_r$; therefore, the other two sides are $$V_g \frac{T_r}{V_a} \text{ and } V_w \frac{T_r}{V_a}$$

This indicates that if the aircraft continues in a straight line after the instant of release it will fly over a point upwind from the target (T) a distance equal to $$V_w \frac{T_r}{V_a}$$

and that this point, the ground track aiming point (GTAP), will be a distance from the release point P equal to $$V_g \left( t_f - \frac{T_r}{V_a} \right)$$

$$\frac{T_r}{V_a}$$

is a ballistic quantity having the dimension of time which is referred to in this specification as $t_1$.

$$t_f - \frac{T_r}{V_a}$$

is another ballistic quantity also having the dimension of time which is referred to in this specification as $t_2$.

It is obvious that trail and time of fall are functions of altitude, airspeed, and missile characteristics, and tables are available for various standard missiles showing the values of $T_r$ and $t_f$ as functions of $h$ and $V_a$. It would be possible to consult these tables when the aircraft has approached the area of the target and to manually insert the values of trail and time of fall corresponding to the then existing airspeed and altitude. Suitable equipment could be provided to compute $t_1$ and $t_2$. Another possible procedure would be to prepare tables or graphs of the values of $t_1$ and $t_2$ and to insert these values into the equipment directly. However, each of these procedures would have the disadvantage that the manually inserted values ($T_r$ and $t_f$ in the first case and $t_1$ and $t_2$ in the second) change rapidly with changes in altitude and airspeed with the result that any differences in altitude and airspeed between the assumed values and the actual values at the time of release would cause large errors in the navigational computations. As a third possibility, equipment could be constructed for computing $t_1$ and $t_2$ continuously for any values of airspeed and altitude, starting with the ballistic characteristics of the missiles. However, such an arrangement would be quite complicated, probably involving the use of separate sets of three dimensional cams for each missile type.

The arrangement herein described yields an accuracy superior to that attainable with the first and second arrangements proposed above without requiring complicated instrumentation. This desirable result is achieved by introducing two new quantities, $B_1$ and $B_2$, which vary far less with altitude and airspeed than do $T_r$, $t_f$, $t_1$ and $t_2$. $B_1$ and $B_2$ are defined as follows:

$$B_1 = \frac{t_1}{h} = \frac{T_r}{V_a h}$$

$$B_2 = \frac{t_2}{\sqrt{\frac{2h}{g}}} = \frac{t_f - \frac{T_r}{V_a}}{\sqrt{\frac{2h}{g}}}$$

If a missile having a horizontal velocity were dropped in a vacuum, it would trace out a parabolic trajectory. Trail would be zero and the time of fall would be equal to $$\sqrt{\frac{2h}{g}}$$

A missile falling through air deviates from the "ideal" parabolic trajectory because of air friction. The quantities $B_1$ and $B_2$ are actually quantities which represent the deviation in the trajectory from the parabolic form. Since the quantities $B_1$ and $B_2$ are themselves only corrections, errors in $B_1$ and $B_2$ will be of secondary importance only. It can be seen from the above definitions that when $B_1$ is zero and $B_2$ is unity, trail is zero, the time of fall is equal to $$\sqrt{\frac{2h}{g}}$$

and the trajectory computed is the parabolic trajectory of the "ideal" missile.

Tables may be prepared, or sets of curves plotted, showing the values of $B_1$ and $B_2$ as functions of altitude and airspeed, using the above definitions and the aforementioned tables of trail and time of fall. A set of such curves, for one particular missile type, is shown in FIG. 12, from which it is apparent that moderate changes in airspeed and altitude will cause but little error in the computations. In practice, the operator consults the tables or curves when the aircraft reaches the vicinity of the target and manually inserts the values of $B_1$ and $B_2$ corresponding to the then obtained values of airspeed and altitude. The ballistics computer 15 (FIG. 2) then combines these values with altitude, ground velocity and wind velocity and computes $V_g t_2$, $V_w t_1 \sin W$ and $V_w t_1 \cos W$. Apparatus for performing these computations is shown schematically in FIG. 13.

Referring now to FIG. 13, a potentiometer 541 is connected across a source of alternating voltage, one terminal of which is grounded. The slider 542 may be manually positioned by means of a knob 543, and the voltage between slider 542 and ground represents the value $B_1$. This voltage proportional to $B_1$ is connected across a linear potentiometer 544, the slider 545 of which is adjusted in accordance with altitude, $h$, thereby multiplying $B_1$ by $h$. A transformer 546 has its primary connected to slider 545 and its secondary connected to a conductor 547, thereby placing on conductor 547 a potential proportional to $t_1$ having a low source impedance and the proper scale factor.

The alternating voltage source is also connected to the primary 548 of a transformer 549. A secondary 551 is connected in opposition to the primary 548 and the resulting voltage is applied across a potentiometer 552. The position of its slider 553 is adjusted by means of a knob 554 so as to obtain a voltage proportional to the selected value of $B_2$. From the definition of $B_2$, $$t_2 = B_2 \sqrt{\frac{2h}{g}}$$

so that $B_2$ must be multiplied by $\sqrt{h}$ to obtain $t_2$. This is accomplished by connecting the slider 553 to a potentiometer 555 which is so wound that the potential of its slider 556 is proportional to the product of the voltage across the potentiometer and the square root of the displacement of the slider. The slider 556 is adjusted in accordance with the altitude, $h$, so that its potential is proportional to $t_2$.

As a practical matter, it is difficult to construct a single potentiometer having sufficient accuracy over the range of interest. Therefore, a second square root potentiometer 557 having a slider 558 is also excited by the potential from the slider 553. The sliders 556 and 558 are connected for simultaneous operation through a gear box 559 and both are varied in accordance with altitude but at different rates. The sliders 556 and 558 are connected to opposite ends of a single-pole double-throw switch 561 which is operated by a cam 562 rotated by the shaft which adjusts the sliders 545, 556 and 558. The potentiometers 555 and 557, the switch 561 and the cam 562 may, for example, be arranged so that the potentiometer 557 is conected for altitudes from zero to 3,000 feet while the potentiometer 555 is connected for altitudes from 3,000 to 60,000 feet. A potential proportional to $t_2$ therefore appears on the conductor 563.

By definition, $t_2$ is equal to $$t_f - \frac{T_r}{V_a}$$

and the presence of $t_f$ in the definition indicates that $t_2$ is measured from the time the missile actually starts falling. It will be recalled that the guidance computer 14 generates a "drop" signal when the aircraft is at a distance equal to $V_g t_2$ from the ground track aiming point. It is inevitable that there will be a certain delay, perhaps on the order of 0.1 second, between the generation of the "drop" pulse and the time the missile actually starts to fall. The computation of the distance $V_g t_2$ should take this into consideration and this is accomplished by adding to the so far computed value of $t_2$ a voltage representing this time lag, designated $t_0$.

The transformer 549 is provided with another secondary winding 566 which is connected across a potentiometer 567, the slider 568 of which may be manually positioned by means of a knob 569 so that the potential of slider 568 is proportional to the proper time lag, $t_0$. This potential is added to that of conductor 563 and the resulting voltage, after passage through a transformer 571, appears on conductor 572.

The values of $V_w t_1 \sin W$ and $V_w t_1 \cos W$ are computed as follows. The voltage of conductor 547 proportional to $t_1$ is applied to the rotor winding 574 of an inductive resolver 575 which has two stator windings 576 and 577. The rotor is automatically positioned in accordance with the wind angle, W, which information is obtained from the navigation system 11. The two stator windings 576 and 577 therefore have induced in them voltages proportional to $t_1 \sin W$ and $t_1 \cos W$ respectively, which voltages are applied to linear potentiometers 578 and 579. The sliders 581 and 582 are positioned in accordance with wind speed, $V_w$, so that the potentials of the sliders are proportional, respectively, to $V_w t_1 \sin W$ and $V_w t_1 \cos W$. These potentials are passed to the guidance computer 14.

A voltage proportional to $V_g t_2$ is obtained by applying the voltage of conductor 572, proportional to $t_2$, to a linear potentiometer 584 the slider 585 of which is positioned in accordance with ground speed, $V_g$. The potential of slider 585 is also passed to the guidance computer 14.

*Physical Arrangement*

In the schematic diagrams of the major components, the individual elements have been shown in that major component to which their function is most closely associated. It will be understood that the physical arrangement of the elements may be somewhat different. For example, the present latitude and present longitude servos have been shown in the coordinate computer 12 while they may be physically located in the navigation system 11. As another example, the resolver 574 (FIG. 13) for computing $V_w t_1 \sin W$ and $V_w t_1 \cos W$ has been shown in the ballistics computer 15 while actually it may be more convenient to place this resolver in the wind computer, which is a part of navigation system 11. Similarly, other elements shown for functional purposes in one component may be physically located elsewhere. It is believed that no confusion will result from this functional, rather than physical, arrangement of the elements with the possible exception of the switches employed to select the target. These switches, although shown in various figures, are actually all mounted on a common shaft for simultaneous operation and are shown in their proper physical relationship in FIG. 14.

Referring now to FIG. 14, there are shown dotted line outlines of the coordinate computer 12, the guidance computer 14, and the intervalometer 16. Within the outlines are shown the various guidance selection switches previously shown and described in connection with other figures of the drawing. Within the outlines of the coordinate computer 12 there are shown the switches 163 and 164 together with those other elements which are associated immediately with them (see also FIG. 4d). The switches 163 and 164, it will be recalled, serve to select the "offset" distances corresponding to targets $T_1$, $T_2$ or $T_3$ so that the coordinates corresponding to the selected target will be computed. Within the outlines of the guidance computer 14 are shown the switches 294 and 295 together with their associated synchros (see also FIG. 7a). These switches (as previously explained) insert the azimuth of the selected target line into the computations. Within the outlines of the intervalometer 16 are shown the switches 491, 492 and 493 (see also FIG. 10) the first two of which energize relays 482 and 516 under certain conditions, as explained in connection with the intervalometer, and the latter of which energizes the short range guidance conductor 523.

All seven of the switches are mounted for simultaneous operation by the shaft 494. This shaft may be stepped by the solenoid 495 and clutch 496 or may be manually positioned by means of a knob 591. This arrangement gives the operator complete control and allows the automatic operation to be overridden at any time. A scale 592 displays the position of the switches at all times.

*Over-All Operation*

Let us now consider the procedure necessary to set up and operate the apparatus for a complete missile dropping mission. It is first necessary to select the targets on which the missiles are to be dropped. This requires the accurate determination of the latitude and longitude of the first target in each group ($T_1$, $T_2$ and $T_3$ of FIG. 1); the determination of the azimuth of each target line; and the determination of the number and spacing of the missiles in each group. Next three fix points which will stand out clearly on a radar display must be selected. The latitude and longitude of each of these points must be determined. One of these points, probably the most centrally located of them, will be designated the prime fix point $F_1$. Next, the type of missile to be used is selected and tables or charts showing the variation of $B_1$ and $B_2$ with altitude and airspeed are prepared. As previously explained, these charts can be computed from the definitions of $B_1$ and $B_2$ and from the standard charts showing trail and time of fall as functions of altitude and airspeed.

The apparatus may now be adjusted while the aircraft is still on the ground with the aid of the foregoing information. First, the azimuths of the target lines may be set into the synchro transmitters 291, 292 and 293 (FIG. 7a). Each synchro transmitter may be provided with a scale to aid in this adjustment. Next the patch board 451 (FIG. 10) is set up to provide the desired missile dropping pattern. Next, the proper value of $t_0$ is selected by means of knob 569 (FIG. 13). This value of $t_0$ depends upon the time lag of the apparatus and once determined should not vary appreciably thereafter.

We are now ready to set the various coordinates and offset distances. Referring to FIG. 4b, the slew control knob 122 is set to its third position and the knobs 107 and 108 are displaced until the precise counters 37 and 63 indicate the latitude and longitude of the prime fix point. The switches 153 and 154 (FIG. 4d) are set to their first position corresponding to $F_1$. The slew control is now moved to its fourth position and the knobs 107 and 108 displaced until the meters 171 and 172 (FIG. 4d) read zero. This procedure sets the shafts 40 and 66 in accordance with the latitude and longitude of the prime fix point. The switches 153 and 154 are now set to their second, or $F_2$ position, and with the slew control in its third position, the knobs 107 and 108 are displaced until the counters 37 and 63 indicate the latitude and longitude of the second fix point $F_2$. This amounts to pretending to fly the aircraft to the second fix point, at which position the coordinates of $F_2$ should be zero. Therefore, the sliders of potentiometers 142 and 143 (FIG. 4d) are adjusted until the meters 171 and 172 read zero. The offsets of $F_3$ are set into potentiometers 141 and 143 in a similar manner. Next, the offset distances of targets $T_1$, $T_2$ and $T_3$ are set into the apparatus as follows: The knob 591 (FIG. 14) is set to its run No. 1 position which adjusts switches 163 and 164 (shown in both FIGS. 14 and 4d) so as to select the first target $T_1$. With the slew control in its third position, the knobs 107 and 108 are displaced until counters 37 and 63 indicate the latitude and longitude of $T_1$. Then, the sliders of potentiometers 145 and 148 are adjusted until the meters 173 and 174 (FIG. 4d) read zero. In a similar manner the offsets for targets $T_2$ and $T_3$ are adjusted.

When the foregoing adjustments have been completed the flight to the area of operations may start. The knob 591 is set to its first position so that the navigation system 11 takes over guidance of the aircraft. The latitude counters 24 and 37 and the longitude counters 53 and 63 are set to the latitude and longitude of the home base at the start of the flight and the navigation system 11 will continuously adjust these counters so as to show present latitude and present longitude. The navigation system 11 may be set to provide long range guidance to any of the points in the area of operation. Nothing further is required to be done until the aircraft reaches this area. However, while the navigation system 11 is a very accurate instrument, the flight to the area of operations may be several thousand miles and it is inevitable that certain errors will creep into the indications of present latitude and present longitude. While en route, the aircraft may pass near some landmark the position of which is known accurately, and if so, a "way point fix" may be made. The six-pole switches 34 and 62 (FIGS. 4a and 4c) are thrown, the slew control knob 122 (FIG. 4b) is turned to its third position, and the known coordinates inserted into the indicators 37 and 63. Traces representing the computed position of the point will now appear on the screen of the radar set 13, and, with the slew control knob in its second position, the present position indicators 24 and 53 may be adjusted until the traces coincide with the direct indication of the radar set. Normal operation is resumed by returning the six-pole switches 34 and 62 to the position shown in the drawing.

It may also be desired to determine the latitude and longitude of some object along the route to the area of operations. If so, the six-pole switches 34 and 62 are operated and the slew control knob 122 set to its first, or "reconnaissance" position. The counters 37 and 63 are slewed until the azimuth and range traces on the radar screen coincide with the position of the object indicated by the radar set, at which time the counters 37 and 63 will indicate the latitude and longitude of the object. After the latitude and longitude are recorded, the slew control knob 122 is returned to its "normal" position, and the six-pole switches 34 and 62 are returned to the position shown in the drawing.

When the area of operations is reached it is desirable to make a last minute correction of present position with the aid of one or more of the fix points $F_1$, $F_2$ and $F_3$. The switches 153 and 154 (FIG. 4d) are set to select that fix point which shows up most clearly in the radar display and traces representing the computed coordinates of this point will also appear on the display. With the slew control in its second position the knobs 107 and 108 are displaced until the traces coincide with the position of the fix point shown by the radar set 13. The latitude counters 24 and 36 and the longitude counters 54 and 63 will now display accurate indications of present position.

Guidance to the first target run can now be started by turning knob 591 (FIG. 14) to the run No. 1 position. A potential will now pass through the switch 493 to the conductor 523 thereby changing the guidance control from long range to short range and guiding the aircraft along the tangent line AB of FIG. 6. At this time, the ballistic quantities $B_1$ and $B_2$ are determined from the aforementioned tables or charts in accordance with the altitude and airspeed of the aircraft at this time. These values of $B_1$ and $B_2$ are inserted into the ballistics computer 15 by means of the knobs 543 and 554 (FIG. 13). The apparatus will now guide the aircraft automatically over the three target lines in succession and drop the missiles in accordance with the pattern set into the patch board.

At some time during the missile dropping operation, the coordinates of the aircraft home base should be set into the navigation system 11 as the desired destination. Then, when the last run is completed, the shaft 494 (FIG. 14) will be stepped by means of the solenoid 495 and the clutch 496 to its fifth position and long range guidance back to the base will be automatically initiated. Of course, the operator may override the automatic operation at any time merely by turning the knob 591.

*Modification of Coordinate Computer*

FIGURE 4d, it will be recalled, shows a portion of the coordinate computer 12. More specifically, FIG. 4d shows the potentiometers used for establishing voltages indicative of the offset distances of $F_2$, $F_3$, $T_1$, $T_2$ and $T_3$ from the prime point $F_1$ and also shows the zeroing meters and the coordinate rotators. It will also be recalled that these potentiometers are adjusted by first setting the prime fix counters 42 and 67 (FIGS. 4a and 4c) to the coordinates of the prime fix point $F_1$ and by then pretending to fly the arcraft (by slewing the set up counters 37 and 63) to each of the remaining points $F_2$, $F_3$, $T_1$, $T_2$ and $T_3$ in turn and adjusting the potentiometers until the zeroing meters read zero.

The above arrangement for setting the potentiometers is quite satisfactory but it has been found that some small errors are introduced. When the aircraft is at fix point $F_2$, for example, the meters 171 and 172 of FIG. 4d examine the voltages $x_{F_2}$ and $y_{F_2}$ on conductors 157 and 158. However, it is the voltages $x'_{F_2}$ and $y'_{F_2}$ at the rotor windings 218 and 219 of the resolver 221 which should be zero and therefore it would be more accurate to examine the voltages at these points when setting the potentiometers. Similarly, the meters 173 and 174 examine the target voltages $x_T$ and $y_T$ on conductors 165 and 166 whereas it is the voltages $x'_T$ and $y'_T$ at the rotor windings 313 and 314 of the resolver 312 (FIG. 7a) in the guidance computer which should be zero when the target potentiometers are adjusted.

It has also been found that the inductive and capacitative coupling in the wiring and the inherent phase shift in the various amplifiers introduces small amounts of quadrature voltage which no adjustment of the potentiometers of FIG. 4d can remove.

The above inaccuracies may be overcome by utilizing a system such as that described and claimed in the copending application of John W. Gray, Serial Number 600,142, filed July 25, 1956, for Voltage Balancing System, now Patent No. 2,857,564 granted October 21, 1958. Such a system, as applied to the present problem, is shown in FIGS. 15a and 15b, which, when taken together, comprise a modification of that portion of the coordinate computer shown in FIG. 4d. A complete diagram of the coordinate computer so modified may be obtained by joining FIGS. 4a, 4b, 4c, 15a and 15b as shown in FIG. 16.

Referring first to FIG. 15a, the conductors 83 and 92 bearing potentials proportional to $x_{F_1}$ and $y_{F_1}$ are connected through the secondary windings of transformers 155 and 156 respectively to the coordinate rotator 215. The voltage proportional to the angle $\alpha$ from potentiometer 182, FIG. 4b, is converted to the position of a shaft 183 by comparing this voltage with the voltage between the center tap and slider of a potentiometer 184. The difference voltage serves as an error signal for a servoamplifier 185 which controls a motor 186 which in turn positions the shaft 183 and the slider of potentiometer 184 in accordance with the angle $\alpha$. These connections are the same as those shown in FIG. 4d except that a five-position switch 621 is connected so that when in its first position the connections are as above described but when in any of its remaining positions the input to the servoamplifier 185 is merely the voltage between the center tap and slider of potentiometer 184 so that the motor 186 will drive the slider to the midpoint which position corresponds to $\alpha = 0$.

The coordinate rotator 215 therefore receives voltages proportional to $x_F$ and $y_F$ and also a shaft position proportional to $\alpha$ and rotates the coordinates to produce voltages proportional to $x'_F$ and $y'_F$ which voltages are passed through the booster amplifiers 216 and 217 to the rotor windings 218 and 219 of the resolver 221. These connections are the same as shown in FIG. 4d and it will be recalled that the resolver 221 is used to derive a voltage proportional to the polar coordinate $\rho$ and a shaft position proportional to the azimuth angle $\theta_F$. Conductors 622 and 623 are connected to the resolver windings 218 and 219 respectively and it is the voltages on these conductors which are made equal to zero when the apparatus is adjusted thereby correcting the first inaccuracy noted above. The apparatus for determining when these voltages are zero will be described later.

Referring now to FIG. 15b, the conductors 83 and 92 are connected through the secondary windings of transformers 161 and 162 respectively to a coordinate rotator 624 which may be the same rotator as is shown in detail in FIG. 4d. The shaft 183 is also connected to this rotator to provide an indication of the angle $\alpha$. A portion of the guidance computer 14 is shown in FIG. 15b since the outputs of the coordinate rotator 624 which are proportional to $x'_T$ and $y'_T$ are used in the guidance computer. These voltages are passed through the secondary windings of transformers 307 and 308 respectively which transformers are used to add voltages from the ballistics computer 15, proportional to $V_w t_1 \sin W$ and $V_w t_1 \cos W$ respectively. These connections are the same as those shown in FIG. 7a except for the addition of two five-position switches 625 and 626 which are arranged so that when they are in their first position as shown in the drawing, the voltages from the ballistics computer are impressed across the primaries of transformers 307 and 308 while when the switches are in any of their remaining positions the primaries of these transformers are short circuited. The secondaries of transformers 307 and 308 are connected through booster amplifiers 309 and 311 to the rotor windings of 314 and 313 of the resolver 312. Conductors 627 and 628 are connected to the rotor windings 314 and 315 respectively and these voltages are made zero when the apparatus is adjusted.

Another five-position switch 629 is provided to select that voltage which is to be made equal to zero when the offset potentiometers are adjusted. The first terminal of switch 629 is grounded while the second, third, fourth and fifth terminals are connected respectively to conductors 622, 623, 627 and 628. The armature of switch 629 is connected to a conductor 631 which leads to the zeroing circuit to be described later. The switches 621, 629, 625 and 626 are connected for simultaneous operation by means of a knob 632.

Referring back to FIG. 15a, the primary winding of transformer 155 is connected through the secondary winding of a transformer 634 to the armature of a three-position switch 635. The first terminal of the switch 635 is grounded while the second and third terminals are connected to the sliders of potentiometers 636 and 637 which have an alternating current impressed across them which is obtained from transformer 638 the secondary of which has a grounded center tap. The potentiometers 636 and 637 serve the same purpose as potentiometers 141 and 142 of FIG. 4d and serve to add a selected voltage to that of the conductor 83 through the transformer 155.

The transformer 634, connected in series with the primary of transformer 155, enables an additional voltage to be added to conductor 83. One terminal of the primary of transformer 634 is connected to the center tap of a resistor 638 the extremities of which are connected, through a capacitor 639, to a source of alternating current. There is therefore impressed across the resistor 638 a voltage which is substantially 90° out of phase with the line voltage. Potentiometers 641, 642 and 643 are connected in parallel with resistor 638 and the sliders of one of these potentiometers may be selectively connected to the other terminal of the primary winding of transformer 634 by means of switch 644. It is therefore possible to add to the voltage of conductor 83 an incremental voltage which is in quadrature with the line voltage.

The secondary of transformer 156 is connected to a network identical to that just described so that conductor 92 may have potentials added thereon which are in phase with the line voltage by means of potentiometers 646 and 647 and potentials which are in quadrature with the line voltage by means of potentiometers 648, 649 and 651. Three-position switches 652 and 653 are provided to select the proper potentiometer and these switches, together with switches 644 and 635 are mechanically connected together for simultaneous operation by means of a knob 654. The knob 654 may be set so as to add voltages to conductors 83 and 92 so as to produce resulting voltages proportional to the coordinates of any selected fix point which voltages are passed by means of conductors 655 and 656 to the coordinate rotator 215.

Referring now to FIG. 15b, a similar network is provided so that voltages may be added to conductors 83 and 92 so as to obtain voltages proportional to the coordinates of any selected target. The knob 658 is provided so that the proper potentiometers may be selected to add both in phase and quadrature increments for each target for both $x$ and $y$ coordinates. The resulting voltages are passed by means of conductors 661 and 662 to the coordinate rotator 624 which therefore has impressed thereon voltages proportional to the coordinates of that target selected by means of the knob 658.

Referring now to the lower portion of FIG. 15b, the zeroing circuit will be described. A synchro 664 has its primary winding connected to a source of alternating current. One terminal 665 of the secondary is grounded; a second terminal 666 is connected to the remainder of the circuit and the third terminal 667 is left unconnected. There is obviously only one position of the rotor of the synchro 664 at which no voltage will appear between terminals 665 and 666 and this position is displayed by means of an indicator 668 connected to the shaft of the synchro. In all other positions of the rotor, a voltage will appear between terminals 665 and 666. This voltage will be slightly out of phase with the line voltage and the network comprising resistor 669 and capacitor 671 is provided so that the voltage at junction 672 is substantially in phase with the line voltage.

The conductor 631, the voltage of which is to be zeroed, is connected to the armature of a single-pole double-throw switch 674. The upper contact of this switch is connected through a capacitor 675 to the junction 676, while the lower contact is connected through a resistor 677 to the junction 676. A capacitor 678 is connected between the junction 676 and ground, and the potential of junction 676 serves as the input to a servo-amplifier 679 which controls a motor 681 connected to the rotor of synchro 667. A capacitor 682 is connected between junctions 672 and 676.

Let it be assumed that the coordinates of the prime fix point $F_1$ have already been adjusted and that we are about to adjust the voltages representing the co-ordinates of $F_2$. Let it also be assumed that the latitude and longitude of the point $F_2$ have already been set into the setup counters 37 and 63 of FIGS. 4a and 4c. Next the knob 654 is turned to its second position to connect the potentiometers for $F_2$. In order to set the potentiometers properly the voltage of conductor 631 must be made zero. The knob 632 is now turned from its normal position to its second or $x'_f$ position. In this position, the switch 621 connects the potential between the slider and center tap of potentiometer 184 to the input of the servo-amplifier 185 so that the shaft 183 will be adjusted to the position corresponding to $\alpha = 0$. The conductor 631 is connected to the two-position switch 674 which is now turned to its upper position as shown in the drawing.

Any potential at junction 672 due to the synchro 664 will appear at the junction 676 reduced in magnitude by the voltage divider action of capacitors 682 and 678 and, if the synchro is in its reference position, the potential of junction 676 due to the synchro will be zero. Any potential appearing at junction 676 will be due to the potential of conductor 631 which potential will appear at junction 676 reduced in magnitude by the voltage divider action of capacitors 675 and 678. This potential is applied to the servoamplifier 679 and, if it contains a component in phase with the line voltage, the motor 681 will be driven and the synchro 664 rotated until the potential of junction 676 is zero. In order to reduce the in phase component of the voltage of conductor 631 to zero, the potentiometer 636 is adjusted until the motor 681 drives the synchro 664 to its reference position.

Next the switch 674 is turned to its lower position. If the synchro 664 is again assumed to be in its reference position, the potential of junction 676 will be the voltage drop across capacitor 678 which is in series with resistor 677. The values of resistor 677 and capacitor 678 are selected so that the voltage drop across capacitor 678 is nearly 90° out of phase with the voltage of conductor 631. This means that if the voltage of conductor 631 has a quadrature component, it will cause a potential to appear at junction 676 which has a component in phase with the line voltage and this component will drive the motor 681 and rotate the synchro 664. The quadrature component on conductor 631 can be balanced out by adjusting the potentiometer 642 (FIG. 15a) until the motor 681 drives the synchro 664 to its reference position as shown by the indicator 668.

The foregoing in phase and quadrature adjustments are not entirely independent but affect each other somewhat. Therefore the switch 674 should be turned back and forth and the potentiometers 636 and 642 adjusted until the indicator 668 remains in its reference position regardless of the position of the switch 674.

In a similar manner, potentiometers 646 and 649 may be adjusted to set the $y$ coordinate of the point $F_2$, and likewise the coordinates of the fix points $F_3$ and the targets $T_1$, $T_2$ and $T_3$ may be adjusted.

Although the adjustments described in connection with FIGS. 15a and 15b are somewhat more complicated than those described in FIG. 4d, they are worthwhile in the interest of accuracy. Furthermore these adjustments need be made but once and can be made before the flight has started so that there is no pressure of time nor necessity for attention to other aspects of the flight problem. Once these adjustments have been made, no further adjustment is required.

The constants of the various networks between conductor 631 and the synchro 664 should be selected to provide the best operation with a minimum of interaction between the real and quadrature adjustments. The following values have been found to be satisfactory.

| | | |
|---|---|---|
| Resistor 667 | ohms | 140,000 |
| Resistor 669 | do | 4,700 |
| Capacitor 678 | microfarad | 0.02 |
| Capacitor 671 | do | 0.01 |
| Capacitor 675 | micromicrofarads | 3,300 |
| Capacitor 682 | do | 10 |

Although the invention has been described in connection with the dropping of missiles, such as bombs or mines, it is equally applicable to apparatus for dropping other objects. For example, the invention makes it possible to drop supplies to remote outposts with great accuracy or to drop emergency equipment at the scene of a disaster. As another example, the aircraft need not be guided over a target line, but may be guided over any other kind of line, such as an airport runway. Many other uses of the invention will occur to those skilled in the art.

What is claimed is:

1. Airborne apparatus for guiding an aircraft from any position on the earth so as to pass over a drop line corresponding to a target line on the surface of the earth on which lie a series of targets of known position to be struck by freely falling missiles, comprising, a dead reckoning navigation system for computing continuously the present position of the aircraft, a coordinate computer receiving present position data from said system for computing continuously the orthogonal coordinates of the first target with respect to present position, a guidance computer receiving data indicative of said coordinates, the missile ballistics and the azimuth of said target line for guiding the aircraft over the drop line and for generating a signal when the aircraft reaches the point at which the first missile should be released, and means responsive to the receipt of said signal for generating a series of signals to release each missile.

2. Airborne apparatus for guiding an aircraft from any position on the earth so as to pass successively over a plurality of drop lines, each drop line corresponding to a target line on the surface of the earth on each of which lie a series of targets of known position to be struck by freely falling missiles, comprising, a dead reckoning navigation system for computing continuously the present position of the aircraft, a coodinate computer receiving present position data from said system for computing continuously the orthogonal coordinates of the first target of each series with respect to present position, a guidance computer receiving data indicative of said coordinates, the missile ballistics, and the azimuths of said target lines for guiding the aircraft over the drop lines and for generating a primary signal when the aircraft reaches each of those points where the first missile of each series should be released, means responsive to the receipt of one of said primary signals for generating a succession of secondary signals to release the individual missiles of each series, and means responsive to the release of the last missile of a series for initiating guidance to the first target of the next succeeding series.

3. An airborne navigation and bombing system comprising, a dead reckoning navigation system for computing continuously the present latitude and longitude of the aircraft, means receiving data indicative of present latitude and longitude from said system for computing continuously the rectangular coordinates of a point of known position with respect to present position, a radar system for displaying on an indicator a representation of the terrain beneath the aircraft including said point of known position, means for generating polar coordinate representations of said rectangular coordinates and displaying them on said indicator, means for adjusting the computed present latitude and present longitude so that the representations of said coordinates coincide with the representation of said point, means receiving present position data from said navigation system for computing continuously the coordinates of a first target, lying on a target line of known azimuth, with respect to present position, means for guiding the aircraft so as to pass over a drop line upwind from and parallel to said target line, means for computing continuously the distance to go along the course to be flown from present position to the release point on said drop line which release point is the point at which a missile should be released in order to strike said first target, means for generating a first signal to drop the first missile when said distance to go becomes zero and means for generating a series of signals for dropping a series of missiles sequentially in accordance with a predetermined pattern.

4. An airborne navigation and bombing system for releasing missiles so as to strike a plurality of points on each of a plurality of predetermined target lines comprising, a dead reckoning navigation system for computing continuously a present latitude and longitude of the aircraft, means receiving data indicative of present latitude and longitude from said system for computing continuously the rectangular coordinates of a point of known position with respect to present position, a radar system for displaying on an indicator a representation of the terrain beneath the aircraft including said point of known position, means for generating polar coordinate representations of said rectangular coordinates and displaying them on said indicator, means for adjusting the computed present latitude and present longitude so that the representations of said coordinates coincide with the representation of said points, means for selecting one of said predetermined target lines, means for computing continuously the coordinates of one point on a selected target line, means for guiding the aircraft so as to pass over a drop line upwind from and parallel to the selected target line, means for computing continuously the distance to go along the course to be flown from present position to the release point on said drop line which release point is the point at which a missile should be released in order to strike said one point, means for generating a first signal to drop a missile when said distance to go beecomes zero, means responsive to the distance travelled from said release point for generating a series of signals for dropping a group of missiles sequentially in accordance with a predetermined pattern, and means responsive to the release of the last missile in said group for selecting another of said target lines.

5. Apparatus for guiding an aircraft along a drop line parallel to a target line of known position on the surface of the earth so that missiles released from the aircraft will strike points on said target line comprising, means for computing continuously data indicative of the orthogonal coordinates of a target point of known position on said target line with respect to the present position of the aircraft, means responsive to data indicative of said coordinates, altitude, wind speed and direction, and the ballistic characteristics of the missile to be released for computing continuously data indicative of the orthogonal coordinates of a ground track aiming point on said drop line, also with respect to the present position of the aircraft, and means utilizing the above computed coordinate data for guiding the aircraft successively along first, second, and third paths, said first path being along a tangent to an imaginary circle which circle is also tangent to said drop line, said second path being along the circumference of said circle to its point of tangency with said drop line and said third path being along said drop line.

6. Apparatus according to claim 5 and further comprising, means for computing continuously the distance from the present position of the aircraft to that point on said drop line at which a missile should be released in order to strike said target point and means for generating a signal when said distance is zero.

7. Apparatus for providing guidance control for an aircraft sucessively along a plurality of drop lines so that missiles dropped from the aircraft while over each of said drop lines will strike targets lying on corresponding target lines comprising, means for providing guidance control for the aircraft along the first of said drop lines, means for generating a series of signals each of which is adapted to initiate the release of one missile and means responsive to the last signal of said series for initiating the generation of guidance control of said aircraft toward the second drop line.

8. Apparatus for guiding an aircraft successively along a plurality of drop lines so that missiles dropped from the aircraft while over each drop line will strike targets lying on a corresponding target line comprising, means for guiding the aircraft along one of said drop lines, means for generating a series of signals each of which is adapted to initiate the release of one missile, automatic means responsive to the last signal of said series for initiating guidance toward the next drop line, and manual means capable of overriding the action of said automatic means for initiating guidance to any of said drop lines.

9. Apparatus for guiding an aircraft successively over a plurality of drop lines so that a series of missiles released while the aircraft is over each drop line will strike targets lying on a plurality of corresponding target lines, comprising, means for guiding the aircraft along a tangent to an imaginary circle, which circle is also tangent to one of said drop lines, means for guiding the aircraft along the circumference of said circle to its point of tangency with said one drop line, means for guiding aircraft along said one drop line, means responsive to the distance travelled along said one drop line for generating a plurality of signals for releasing a series of missiles, and automatic means responsive to the last of said signals for initiating guidance toward the next drop line.

10. Apparatus according to claim 9, further comprising, manual means capable of overriding the action of said automatic means for initiating guidance to any of said drop lines.

11. Apparatus for continuously generating voltages representing the rectangular coordinates of a selected one of a plurality of points of known position with respect to axes the origin of which is the present position of a moving vehicle comprising, means for continuously generating a first pair of voltages representing the coordinates of one of said points, means for establishing additional pairs of voltages representing the coordinates of each of the remaining points with respect to said one point, means for selecting any one of said additional pairs of voltages and means for adding algebraically the selected pair of voltages to said first pair of voltages to obtain a further pair of voltages representing the coordinates of the selected point with respect to the present position of the vehicle.

12. Apparatus for continuously generating voltages representing the rectangular coordinates of a selected one of a plurality of fix points of known position, referred to a first set of axes the origin of which is the present position of a moving vehicle and one axis of which is the meridian through said present position comprising, means for continuosuly generating a first pair of voltages representing the rectangular coordinates of one of said points referred to a second set of axes the origin of which is at said present position and one axis of which is parallel to the meridian through said point, means for establishing additional pairs of voltages representing the rectangular coordinates of each of the remaining points with respect to a third set of axes the origin of which is at said one point and one axis of which is the meridian through said one point, means for selecting any one of said additional pairs of voltages, means for adding algebraically the selected pair of voltages to said first pair of voltages to obtain a further pair of voltages indicative of the coordinates of the selected point with respect to said second set of axes and means for generating voltages indicative of said last named coordinates as modified by rotation through an angle equal to the angle between the meridian through said one point and said present position, whereby the desired coordinates are obtained.

13. Apparatus for guiding an aircraft along a drop line so that a missile released while the aircraft is travelling over said drop line will strike a target lying on a corresponding target line comprising, means for guiding the aircraft along the drop line, means for computing continuously the distance along said drop line from the aircraft's present position to the point over which the missile is to be released, means for generating a signal when said distance becomes zero, means for computing the amount by which a missile, if released when said distance is zero, would miss its target and means responsive to said amount for transmitting said signal to either a first or a second channel.

14. In a navigation and missile releasing system for dropping a series of missiles from an aircraft so as to strike a series of targets lying on the same predetermined straight line, apparatus for computing the accuracy with which the first missile will strike its target comprising, means for computing the position of the ground track aiming point for the first target of the series, means for computing continuously a first distance equal to the distance along the desired ground path from the ground track aiming point to the point at which the first missile should be released, means for computing continuously a second distance equal to the perpendicular distance from the present position of the aircraft to the desired ground path, means for computing the angle between the actual and desired courses of the aircraft, means for multiplying the computed angle by said first distance and means for comparing the product with said second distance.

15. In a navigation and missile releasing system for dropping a series of missiles from an aircraft so as to strike a series of targets lying on the same predetermined straight line, apparatus for computing the accuracy with which the first missile will strike its target, comprising means for computing the position of the ground track aiming point for the first target of the series, means for computing continuously a first distance equal to the distance along the desired ground path from the ground track aiming point to the point at which the first missle should be released, means for computing continuously a second distance equal to the perpendicular distance from the present position of the aircraft to the desired ground path, means for computing continuously a third distance equal to the distance along the desired ground path from the aircraft's present position to the point at which the first missile should be released, means for computing the angle between actual and desired courses of the aircraft, means for multiplying the computed angle by said first distance, and means for comparing the product with said second distance when said third distance becomes zero.

16. In a navigation and missile releasing system for dropping a series of missiles from an aircraft so as to strike a series of targets lying on a predetermined target line and in which the aircraft is flown over a drop line parallel to and upwind from said target line, apparatus for determining whether the missiles will strike their targets with sufficient accuracy comprising, means for computing continuously the position on said drop line of the ground track aiming point for the first target of the series, means for computing continuously a first value proportional to the distance along the drop line from said ground track aiming point to the release point, said release point being the point at which the first missile is to be released, means for computing continuously a second value equal to the distance along the drop line from the aircraft's present position to the release point, means for generating a signal when said second value becomes zero, means for computing continuously a third value proportional to the perpendicular distance from the present position of the aircraft to said drop line, means for computing continuously the angle between the actual course of said aircraft and said drop line, means for multiplying the computed angle by said first value, means for subtracting the product from said third value to obtain a fourth value and means jointly responsive to said fourth value and the computed angle for transmitting said signal to one or another channel.

17. Apparatus for guiding an aircraft successively along a plurality of drop lines so that missiles released while the aircraft is travelling over each drop line will strike targets lying on a plurality of corresponding target lines comprising, means for guiding the aircraft along the first drop line, means for computing continuously the distance along the drop line from the aircraft's present position to the point over which the first missile is to be released, means for generating a signal when said computed distance becomes zero, means for computing the amount by which a missile if released when said distance is zero would miss its target, means responsive to said amount for diverting said signal to either a first or second channel, means responsive to the presence of a signal in said first channel for generating a series of missile dropping signals, and automatic means responsive to either the presence of a signal in said second channel or the last missile dropping signal for initiating guidance to the next drop line.

18. Apparatus according to claim 17 further comprising, manually operable means capable of overriding the action of said automatic means for initiating guidance to any desired drop line.

19. In an aircraft navigation and missile releasing system for dropping a series of missiles on a predetermined straight line, apparatus for controlling the release of missiles in accordance with the accuracy with which they may be expected to strike their targets comprising, means for computing the location of the drop line over which the aircraft should be flown, means for computing the position on said drop line of the release point over which the first missile should be released, means for computing continuously the distance parallel to said drop line from the aircraft's present position to said release point, means for generating a signal when said distance becomes zero, and means jointly responsive to the lateral deviation of the aircraft from said drop line and to the angle between said drop line and the actual course of the aircraft when said distance is zero for transmitting said signal to either a first or a second channel.

20. A navigation and missile releasing system, comprising, a long range navigation system for providing guidance control for a vehicle to and from an area of operations, a short range navigation system receiving data from said long range system for providing guidance control for said vehicle along a predetermined path, manually operable means for transferring guidance control from said long range system to said short range system, means responsive to the position of said vehicle on said predetermined path for sequentially releasing a plurality of missiles in accordance with a predetermined pattern and for generating a signal upon the release of the last of said plurality of missiles, and means responsive to the receipt of said signal for transferring guidance control from said short range system to said long range system.

21. A navigation and missile releasing system, comprising, a long range navigation system for providing guidance control for a vehicle to and from an area of operations, an object locating system receiving data from said long range system for checking the accuracy of said long range system, a short range navigation system receiving data from said long range system for providing guidance control for said vehicle along a predetermined path, said long and short range systems providing guidance control alternatively, manually operable means for transferring guidance control from said long range system to said short range system, means responsive to the position of said vehicle on said predetermined path for sequentially releasing a plurality of missiles in accordance with a predetermined pattern and for generating a signal upon the release of the last of said plurality of missiles, and means responsive to the receipt of said signal for transferring guidance control from said short range system to said long range system.

22. Airborne apparatus for providing guidance control for an aircraft so that a series of missiles released successively from said aircraft will strike a series of points on a predetermined target line of known position, comprising, means for computing continuously the orthogonal coordinates of a target point of known position on said target line with respect to the present position of said aircraft, means responsive to data indicative of said coordinates, altitude, airspeed, wind speed and direction, and the ballistic characteristics of the missiles to be released for computing continuously the orthogonal coordinates of a ground track aiming point on a drop line upwind from and parallel to said target line, also with respect to the present position of said aircraft, whereby the position of said drop line is determined, and means utilizing data indicative of said last named coordinates for providing guidance control for said aircraft from present position to and along said drop line.

23. Airborne apparatus for generating signals serving to guide an aircraft so as to pass over a first line parallel to a second predetermined straight line on the surface of the earth, comprising, a first computer circuit for generating a first signal indicative of the departure of said aircraft from a path above a third line tangent to an imaginary circle which circle is also tangent to said first line and for generating a second signal which decreases as said aircraft approaches said circle, said first and second signals being for use in guiding said aircraft over said third line, means controlled by said second signal and operable when said second signal decreases to a predetermined magnitude for establishing a second computer circuit which circuit is for generating a third signal indicative of the departure of said aircraft from a path over that arc of said circle extending between the points of tangency of said third and first lines and for generating a foruth signal which decreases as said aircraft approaches said first line, said third and fourth signals being for use in guiding said aircraft over said arc of said circle, and means controlled by said fourth signal and operable when said fourth signal decreases to a predetermined magnitude for establishing a third computer circuit which circuit is for generating a fifth signal indicative of the departure of said aircraft from a path over said first line, said fifth signal being for use in guiding said aircraft over said first line.

References Cited in the file of this patent

UNITED STATES PATENTS

| | | |
|---|---|---|
| 2,374,978 | Burreson | May 1, 1945 |
| 2,479,909 | Darlington | Aug. 23, 1949 |
| 2,504,492 | Brown | Apr. 18, 1950 |
| 2,633,567 | Tull | Mar. 31, 1953 |
| 2,654,882 | Ergen | Oct. 6, 1953 |
| 2,709,807 | Strong | May 31, 1955 |
| 2,711,856 | Grey et al. | June 28, 1955 |
| 2,733,436 | Doba et al. | Jan. 31, 1956 |
| 2,743,436 | Gale | Apr. 24, 1956 |
| 2,781,168 | Greenwood | Feb. 12, 1957 |
| 2,823,586 | Havens et al. | Feb. 18, 1958 |
| 2,825,055 | Chance | Feb. 25, 1958 |
| 2,898,809 | Ryan | Aug. 11, 1959 |